US012645833B2

(12) United States Patent
Zhang et al.

(10) Patent No.: US 12,645,833 B2
(45) Date of Patent: Jun. 2, 2026

(54) METHOD AND APPARATUS FOR AUTOMATIC SPEECH RECOGNITION

(71) Applicant: SAMSUNG ELECTRONICS CO., LTD., Suwon-si (KR)

(72) Inventors: Jisi Zhang, Staines (GB); Md Asif Jalal, Staines (GB); Karthikeyan Saravanan, Staines (GB); Pablo Peso Parada, Staines (GB); Mete Ozay, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 73 days.

(21) Appl. No.: 18/629,401

(22) Filed: Apr. 8, 2024

(65) Prior Publication Data

US 2024/0289491 A1     Aug. 29, 2024

Related U.S. Application Data

(63) Continuation of application No. PCT/KR2024/002178, filed on Feb. 20, 2024.

(30) Foreign Application Priority Data

Feb. 28, 2023     (GB) ..................................... 2302914
Feb. 14, 2024     (GB) ..................................... 2402020

(51) Int. Cl.
    *G06F 21/62*          (2013.01)
    *G10L 15/02*          (2006.01)
        (Continued)

(52) U.S. Cl.
    CPC .......... *G06F 21/6254* (2013.01); *G10L 15/02* (2013.01); *G10L 15/063* (2013.01);
        (Continued)

(58) Field of Classification Search
    CPC ... G06F 21/6254; G10L 15/02; G10L 15/063; G10L 15/16; G10L 15/22; G10L 15/30; G10L 21/007; G10L 21/0208
    See application file for complete search history.

(56) References Cited

U.S. PATENT DOCUMENTS

| | | | |
|---|---|---|---|
| 10,601,786 | B2 | 3/2020 | Whaley et al. |
| 10,607,597 | B2 | 3/2020 | Mun et al. |

(Continued)

FOREIGN PATENT DOCUMENTS

| | | |
|---|---|---|
| CN | 112151016 A | 12/2020 |
| CN | 112182633 A | 1/2021 |

(Continued)

OTHER PUBLICATIONS

Daniel S. Park et al., "Improved Noisy Student Training for Automatic Speech Recognition", Proceedings of Interspeech 2020, Oct. 2020, pp. 2817-2821, DOI: 10.21437/Interspeech.2020-1470.

(Continued)

*Primary Examiner* — Izunna Okeke
(74) *Attorney, Agent, or Firm* — Sughrue Mion, PLLC

(57)     ABSTRACT

Broadly speaking, the present disclosure relates to a computer-implemented method for training a machine learning, ML, automatic speech recognition, ASR, model. The method comprises injecting a speaker anonymiser, which is configured to cause the ML ASR model to generate anonymised acoustic embeddings for the ML ASR model, at one or more layers of the ML ASR model, and suitably training the ML ASR model including the speaker anonymiser on audio data comprising an utterance with one or more words to be recognised. Correspondingly, there is also described a computer implemented method for performing automatic speech recognition using the trained ML ASR model and system for training/inference thereof.

15 Claims, 25 Drawing Sheets

(51) Int. Cl.

| | |
|---|---|
| *G10L 15/06* | (2013.01) |
| *G10L 15/16* | (2006.01) |
| *G10L 15/22* | (2006.01) |
| *G10L 15/30* | (2013.01) |
| *G10L 21/007* | (2013.01) |
| *G10L 21/0208* | (2013.01) |

(52) U.S. Cl.
CPC .............. *G10L 15/16* (2013.01); *G10L 15/22* (2013.01); *G10L 15/30* (2013.01); *G10L 21/007* (2013.01); *G10L 21/0208* (2013.01)

(56) References Cited

U.S. PATENT DOCUMENTS

| | | | |
|---|---|---|---|
| 11,210,583 | B2 | 12/2021 | Mathew et al. |
| 11,217,223 | B2 | 1/2022 | Gkoulalas-Divanis et al. |
| 2014/0278366 | A1 | 9/2014 | Jacob et al. |
| 2019/0088251 | A1 | 3/2019 | Mun et al. |
| 2021/0029124 | A1 | 1/2021 | Buford et al. |
| 2021/0193159 | A1* | 6/2021 | Pearson .............. G10L 21/0364 |
| 2021/0233530 | A1* | 7/2021 | Thomson ................ G10L 15/30 |
| 2021/0256978 | A1 | 8/2021 | Jin et al. |
| 2022/0318429 | A1 | 10/2022 | Levy et al. |
| 2022/0399009 | A1 | 12/2022 | Okada et al. |
| 2023/0161901 | A1 | 5/2023 | Lee et al. |
| 2024/0256706 | A1* | 8/2024 | Saifee ................... G10L 21/028 |

FOREIGN PATENT DOCUMENTS

| | | | |
|---|---|---|---|
| CN | 114822548 | A | 7/2022 |
| CN | 115427958 | A | 12/2022 |
| JP | 2007-304505 | A | 11/2007 |
| KR | 10-2019-0031785 | A | 3/2019 |
| KR | 10-2022-0032322 | A | 3/2022 |
| KR | 10-2392300 | B1 | 4/2022 |
| KR | 10-2022-0107703 | A | 8/2022 |
| KR | 10-2500255 | B1 | 2/2023 |
| WO | 2021/152566 | A1 | 8/2021 |

OTHER PUBLICATIONS

International Search Report (PCT/ISA/210) issued May 29, 2024 by the International Searching Authority in the International Patent Application No. PCT/KR2024/002178.

Written Opinion (PCT/ISA/237) issued May 29, 2024 by the International Searching Authority in the International Patent Application No. PCT/KR2024/002178.

Turner et al., "Speaker Anonymization with Distribution-Preserving X-Vector Generation for the VoicePrivacy Challenge 2020", ArXiv, Oct. 26, 2020, 5 total pages, arXiv:2010.13457v1, doi:10.48550/arXiv.2010.13457.

Onesimu et al., "An efficient clustering-based anonymization scheme for privacy-preserving data collection in IoT based healthcare services", Peer-to-Peer Networking and Applications, Feb. 21, 2021, pp. 1629-1649, vol. 14, doi:10.1007/s12083-021-01077-7.

Communication dated Nov. 20, 2024, issued by the United Kingdom Patent Office for United Kingdom Patent Application No. 2402020.8.

\* cited by examiner

FIG. 2

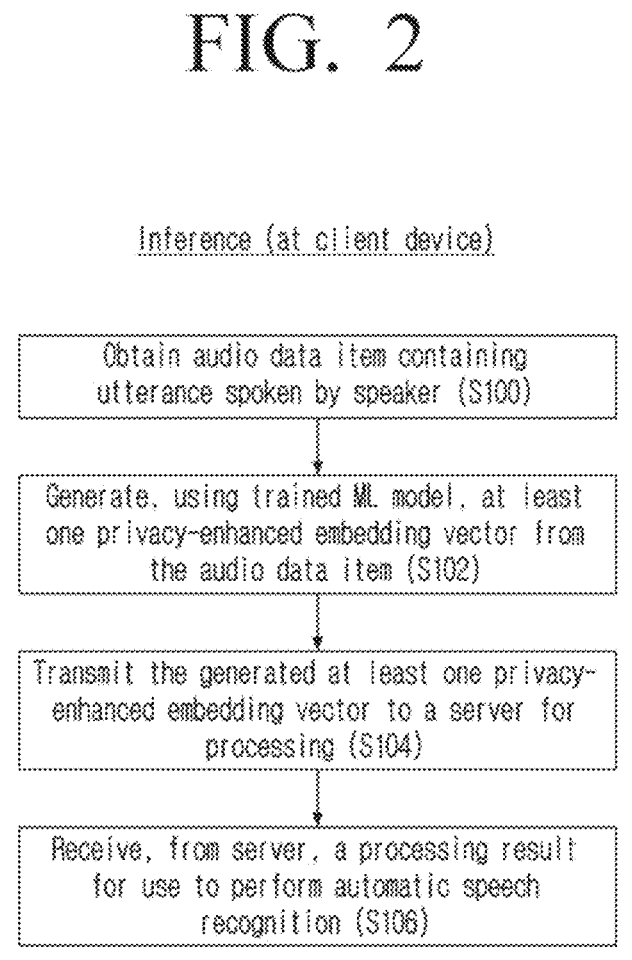

Inference (at client device)

Obtain audio data item containing
utterance spoken by speaker (S100)

Generate, using trained ML model, at least
one privacy-enhanced embedding vector from
the audio data item (S102)

Transmit the generated at least one privacy-
enhanced embedding vector to a server for
processing (S104)

Receive, from server, a processing result
for use to perform automatic speech
recognition (S106)

FIG. 3

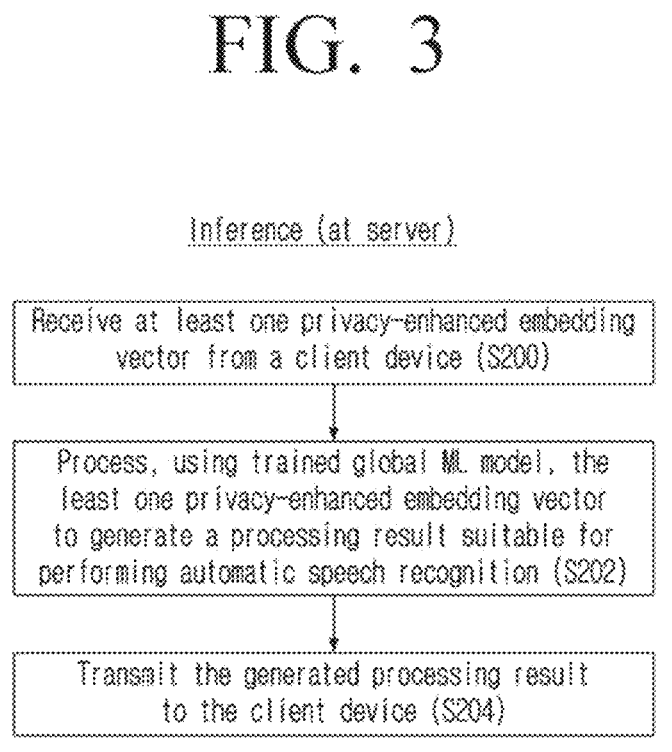

Inference (at server)

Receive at least one privacy-enhanced embedding
vector from a client device (S200)

Process, using trained global ML model, the
least one privacy-enhanced embedding vector
to generate a processing result suitable for
performing automatic speech recognition (S202)

Transmit the generated processing result
to the client device (S204)

FIG. 4

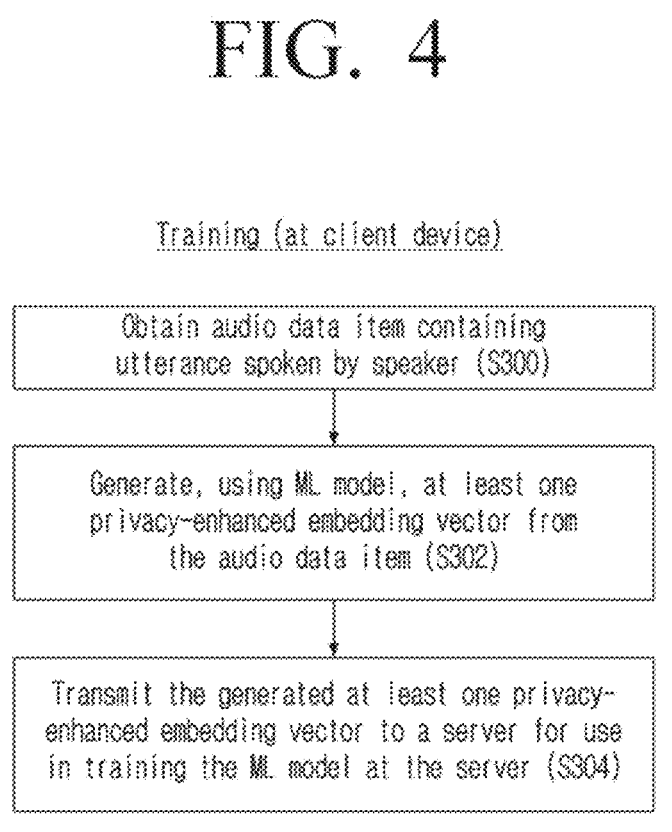

Training (at client device)

Obtain audio data item containing
utterance spoken by speaker (S300)

Generate, using ML model, at least one
privacy-enhanced embedding vector from
the audio data item (S302)

Transmit the generated at least one privacy-
enhanced embedding vector to a server for use
in training the ML model at the server (S304)

FIG. 5

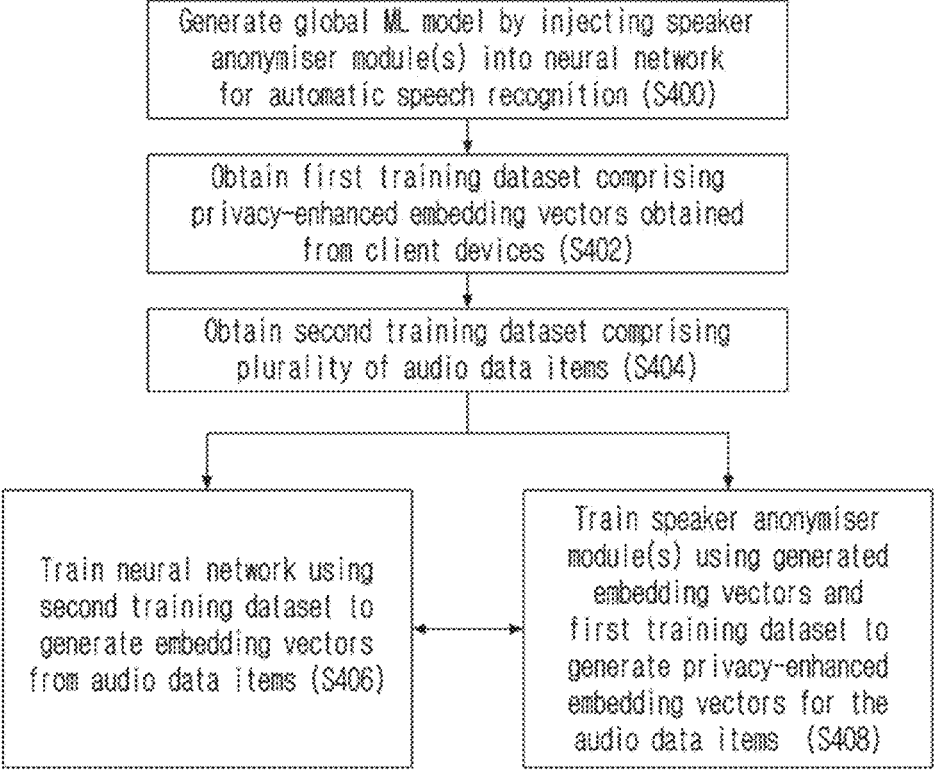

Training (at server)

Generate global ML model by injecting speaker anonymiser module(s) into neural network for automatic speech recognition (S400)

Obtain first training dataset comprising privacy-enhanced embedding vectors obtained from client devices (S402)

Obtain second training dataset comprising plurality of audio data items (S404)

Train neural network using second training dataset to generate embedding vectors from audio data items (S406)

Train speaker anonymiser module(s) using generated embedding vectors and first training dataset to generate privacy-enhanced embedding vectors for the audio data items (S408)

Stage 1

(a) Training and embedding extraction of ASR model

Stage 2

(b) Embedding-to-audio synthesis training (c) Separate Speaker embedding representation and classifier training Stage 3

(d) Speaker anonymization
Evaluation

FIG. 18

| Train Data | GRL | α/λ | test-adv WER(%) | dev-clean WER(%) | test-clean WER(%) | test-other WER(%) |
|---|---|---|---|---|---|---|
| train clean 100 | - | - | - | 6.14 | 6.18 | 16.28 |
| | CE3 | 0.01/0.5 | 4.55 | 5.38 | 5.58 | 16.27 |
| | | 0.1/0.3 | 3.23 | 5.48 | 5.72 | 15.94 |
| | | 1.5/0.3 | 3.48 | 6.19 | 6.77 | 18.09 |
| | | 1.0/0.1 | 3.51 | 6.06 | 6.47 | 18.27 |
| | | 0.5/0.5 | 3.08 | 5.76 | 6.23 | 17.63 |
| | | 1.0/0.05 | 3.85 | 5.68 | 5.92 | 17.57 |
| | CE5 | 0.5/0.5 | 2.81 | 6.27 | 6.74 | 18.31 |
| | | 0.1/0.3 | 3.73 | 5.34 | 5.75 | 15.96 |
| | | 0.01/0.3 | 3.69 | 5.26 | 5.47 | 16.04 |
| | | 0.5/0.05 | 2.78 | 5.54 | 5.80 | 16.85 |
| | | 1.0/0.1 | 3.36 | 5.89 | 6.27 | 17.36 |
| | CE7 | 1.0/0.05 | 4.29 | 5.78 | 6.11 | 17.55 |
| | | 0.05/0.3 | 3.69 | 5.41 | 5.64 | 15.92 |
| | CE10 | 1.0/0.3 | 3.59 | 5.95 | 6.31 | 17.46 |
| | | 0.1/0.3 | 4.02 | 5.47 | 5.88 | 17.09 |
| | | 0.5/0.5 | 4.12 | 6.12 | 6.71 | 17.93 |
| | CE4 | 0.5/0.3 | 3.27 | 5.60 | 5.94 | 17.30 |
| | | 0.5/0.5 | 4.21 | 5.63 | 5.87 | 17.32 |
| | | 1.0/0.1 | 4.12 | 5.42 | 6.10 | 17.02 |

FIG. 19

| Train Data | Model | GRL | dev-clean WER(%) | α/λ | AE | dev-clean-te SPK-ACC |
|---|---|---|---|---|---|---|
| train clean 100 | original audio | – | – | – | – | 96.9 |
| | Baseline | – | 6.14 | – | CE3 | 86.6 |
| | adv CE1 | CE1 | – | 0.5/0.05 | CE3 | 73.9 |
| | | | | | CE4 | 41.7 |
| | | | | | CE5 | 42.9 |
| | adv CE3D_v1 | CE3 | 5.76 | 0.5/0.5 | CE3 | 64.6 |
| | | | | | CE4 | 33.8 |
| | | | | | CE5 | 14.8 |
| | adv CE3D_v2 | CE3 | 6.06 | 1.0/0.1 | CE3 | 71.1 |
| | | | | | CE5 | 18.0 |
| | adv CE5D | CE5 | 5.54 | 0.5/0.05 | CE5 | 18.2 |
| | | | | | CE6 | 0.8 |
| | | | | | CE7 | 0.4 |
| | adv-CE100 | CE10 | 5.48 | 0.5/0.3 | CE3 | 68.8 |
| | | | | | CE5 | 70.2 |
| train clean 460 | adv CE3D_v3 | CE3 | – | 1.0/0.3 | CE3 | 48.0 |
| | | | | | CE5 | 11.1 |

METHOD AND APPARATUS FOR AUTOMATIC SPEECH RECOGNITION

CROSS-REFERENCE TO RELATED APPLICATIONS

This application is a by-pass continuation application of International Application No. PCT/KR2024/002178, filed on Feb. 20, 2023, which is based on and claims priority to United Kingdom Patent Application No. 2302914.3, filed on Feb. 28, 2023, in the United Kingdom Intellectual Property Office and United Kingdom Patent Application No. 2402020.8, filed on Feb. 14, 2024, in the United Kingdom Intellectual Property Office, the disclosures of which are incorporated by reference herein their entireties.

BACKGROUND

1. Field

The present application generally relates to a method for automatic speech recognition, ASR. In particular, the present application provides a method for using a trained machine learning, ML, model to process audio data items containing utterances of a speaker and performing automatic speech recognition, as well as a method to train the model. More particularly, the present techniques relate to a user privacy-protecting method for performing ASR and training the ML model to perform ASR.

2. Description of Related Art

The increasing prevalence of voice driven human-computer interaction services in appliances has raised concern with regard to voice privacy and personal information protection. These 'smart' devices, ranging from cars to small watches, collect speech utterances and acoustic events for various downstream tasks or for training and evaluation in distributed settings. Since speech data comprises, inter alia, speaker identity and personal sensitive information, privacy preservation is an important consideration.

Various privacy preservation methods for speech have been proposed in the literature. One solution is to manipulate speaker identity related features through feature perturbation, voice normalisation, utterance slicing techniques, and differential pitch anonymization. Another is to employ a neural based speech synthesizer or voice converter to generate speech where the speaker identity information has been removed. Such methods however require employment of additional synthesis modules and are computationally expensive, which is unrealistic for on-device scenarios.

More recently, another approach for speaker anonymization is to learn speech representations invariant to speaker conditions. Domain adversarial training trains a model to learn domain agnostic representations. Speaker based domain adversarial training has been effective for anonymizing latent representations of automatic speech recognition (ASR) models (i.e., acoustic embeddings). These approaches however have resulted in a reduction of ASR performance.

The applicant has therefore identified the need for improved techniques for preserving privacy in ASR frameworks.

SUMMARY

By way of introduction, the present techniques relate to a flexible gradient reversal based speaker anonymization framework, which learns speaker anonymous acoustic embeddings within an ASR model while preserving accuracy and performance when compared with present (non-private) ASR approaches. In a typical ASR model, the initial layers learn generic acoustic and prosody features, and the last layers learn more task-dependent semantic and syntax level features. The present techniques focus on embeddings at the initial layers of ASR models, and introduce an acoustic embedding-to-waveform synthesis model to synthesise the corresponding audio waveform of the acoustic embedding for better understanding and interpretation.

Notably, the present techniques utilise single gradient reversal at flexible layers of an ASR model to effectively mitigate speaker information from the representations generated by initial layers of the model without increasing its word error rate (WER). Beneficially, performance of the models trained with these representations was improved on average. The proposed method does not require computationally expensive voice-conversion/speech-synthesis models for anonymization and it operates on ASR embeddings.

In a first approach of the present techniques, there is provided a computer-implemented method, performed by an electronic client device, for automatic speech recognition, ASR, the method comprising: obtaining an audio data item containing an utterance spoken by a speaker; generating, using a trained machine learning, ML, model on the client device, at least one privacy-enhanced embedding vector for the audio data item, wherein the at least one privacy-enhanced embedding vector anonymises the speaker; transmitting the at least one privacy-enhanced embedding vector to a server for processing by a global machine learning, ML, model on the server; and receiving, from the server, a processing result output by the global ML model for the at least one privacy-enhanced embedding vector that enables the client device to perform ASR. The processing result output by the global ML model is then used by the client device to generate the text corresponding to the input audio data item. The text may be displayed on a display of the client device.

There are at least two problems with existing ASR systems. One problem arises when ASR is being performed on-device, meaning that the ASR is being performed on a client electronic device, which is typically a resource-constrained end-user or edge device. A non-limiting example client device is a smart phone. In this case, an ML model for ASR that is provided on a client electronic device is not very powerful, due to the limited resources of the client device to implement/execute an ML model. As a result, the accuracy of the outputs of the ML model may be low or lower than desirable. Low accuracy can have impacts on downstream tasks, such as speech-to-text, voice-control or voice-activation, and so on.

Another problem arises when ASR is being performed for a client device using an ML model being executed on a server. Here, the server is not resource-constrained, and so has the processing capability and memory to execute a more powerful, larger ML model, which means the accuracy of the outputs of the ML model may be high and more acceptable. However, in this case, a client device needs to transmit to the server either raw audio data items which contain utterances of a speaker (e.g. a user of the client device), or embedding vectors representing audio/acoustic features extracted from the raw audio data items. This is problematic from a user-privacy perspective, because potential sensitive user data, including characteristics of the user's voice, is transmitted off-device. It is desirable to keep user data on-device (i.e. on the client device) to reduce the risk that sensitive and personal data is intercepted or obtained by malicious third parties.

Advantageously, the present techniques provide a solution to the above mentioned problems of accuracy and privacy. The present techniques make use of the larger ML model on a server to perform ASR or a step(s) in an ASR process for the purposes of accuracy, but maintain user privacy. Instead of transmitting raw audio data items or embedding vectors representing features of the raw audio data items to the server, the client device generates privacy-enhanced embedding vectors from raw audio data items, which anonymise the speaker/user. This means that characteristics of the user's voice (e.g. anything that could be used to identify the user, prosody, pitch, tempo, volume, accent, etc.) are removed so that the ML model cannot determine who the user is or try to recreate their voice. The privacy-enhanced embedding vectors therefore represent the utterance without the voice characteristics of the user. The result is a highly accurate ASR process that maintains user privacy.

Generating the at least one privacy-enhanced embedding vector may comprise: removing, using the trained ML model, audio information from the audio data item that identifies the speaker, so that the generated at least one privacy-enhanced embedding vector anonymises the speaker. As explained in more detail below, the audio information that identifies the speaker, and which is removed by the trained ML model, may include any one or more of the following: speaker identifier (such as gender, or any personal information such as name, address, job, location, employer, etc.), prosody, pitch, and speaking style. It will be understood that this is a non-exhaustive list of example characteristics or information that could be removed from the audio data item to anonymise the speaker. It will also be understood that the trained ML model may have been trained to recognise such characteristics or information and to remove them.

Generating at least one privacy-enhanced embedding vector may comprise: removing, using the trained ML model, background noise from the audio data item so that the generated at least one privacy-enhanced embedding vector only represents the utterance spoken by the speaker. Background noise may contain information that could identify the speaker or contain other utterances that are private. For example, if the background noise contains utterances from a conversation between other members of the speaker's household or workplace, the utterances themselves may be private or contain sensitive/confidential information, or may reveal the identity of the speaker, or may reveal information about the speaker (such as where they work, who they live with, etc.)

The method may further comprise: augmenting, using the trained ML model, the generated at least one privacy-enhanced embedding vector, in embedding space to further anonymise the speaker. That is, after the at least one privacy-enhanced embedding vector has been generated, the method may augment the embedding vector to alter the embedding vector, which helps to anonymise the speaker even more. The augmentation may occur in embedding space, i.e. the space of the embedding vectors that represent the audio data items. In embedding spaces, embedding vectors which are similar are positioned closer to each other. In other words, the augmentation happens after the embedding vector has been generated, rather than on the original audio signal of the audio data item. This is in contrast to existing techniques, where data augmentation is commonly applied to the raw signal speech signal. An advantage of performing the augmentation is that it improves the performance of the ASR model, because this enables a larger training dataset to be generated, where the training dataset comprises the privacy-enhanced embedding vectors, and augmented versions of the privacy-enhanced embedding vectors. In some cases, the client device performs the augmentation. In other cases, the server may perform the augmentation. In both cases, the augmentation is being performed on the privacy-enhanced embedding vectors, rather than the raw audio signal/waveform. However, it will be understood that this is particularly relevant when the augmentation is performed on the server, because the server does not have access to the raw audio signal/waveform.

For example, augmenting the generated at least one privacy-enhanced embedding vector may comprise adding at least one of the following to the generated embedding vector: noise and reverberation. Noise may be added by adding a specific time domain noise signal to the generated embedding vector. For example, a noise value, vector or matrix representing the noise signal may be added to the generated embedding vector so that each value of the generated embedding vector is modified. Similarly, reverberation may be added by adding a specific reverberation impulse response to the generated embedding vector.

Additionally or alternatively, augmenting the generated at least one privacy-enhanced embedding vector may comprise altering spectral information and/or time information contained within the at least one privacy-enhanced embedding vector.

In summary, in order for the privacy-enhanced embedding vector to be generated, the following steps are performed on the client device: inputting the audio data item into the trained ML model on the client device, wherein the trained ML model comprises a neural network (e.g. a neural network having a plurality of layers); extracting, using the neural network, at least one embedding vector representing acoustic features of the audio data Item; and generating, using the neural network, at least one privacy-enhanced embedding vector from the extracted at least one embedding vector. The step to generate the privacy-enhanced embedding vector comprises any of the techniques described above (e.g. removing audio information and/or augmentation).

The neural network may comprise an encoder and a decoder, each having a plurality of layers. The encoder and decoder may each comprise a plurality of layers. The at least one privacy-enhanced embedding vector may be generated by the encoder of the neural network. This privacy-enhanced embedding vector is sent to the server for processing, and the client device receives a processing result from the server, which is output by the global ML model. The processing result may then be input into the decoder of the ML model on the client device, so that text corresponding to the input audio data item can be generated. The global ML model uses the privacy-enhanced embedding vector to perform the analysis necessary to encode the speech information, which enables client devices to harness the power of the global ML model. The decoding is then performed on-device to provide the transcript/text to the user.

In a second approach of the present techniques, there is provided an electronic client device for automatic speech recognition, ASR, the electronic client device comprising: a microphone arranged to capture an audio data item containing an utterance spoken by a speaker; and at least one processor coupled to memory, arranged for: generating, using a trained machine learning, ML, model on the client device, at least one privacy-enhanced embedding vector for the audio data item, wherein the at least one privacy-enhanced embedding vector anonymises the speaker; transmitting the at least one privacy-enhanced embedding vector to a server for processing by a global machine learning, ML, model on the server; receiving, from the server, a processing result output by the global ML model for the at least one privacy-enhanced embedding vector that enables the client device to perform ASR.

The features described above with respect to the first approach apply equally to the second approach and therefore, for the sake of conciseness, are not repeated.

The client device may be a constrained-resource electronic device, but which has the minimum hardware capabilities to personalize and use a trained neural network/ML model. The client device may be any one of: a smartphone, tablet, laptop, computer or computing device, virtual assistant device, a vehicle, an autonomous vehicle, a robot or robotic device, a robotic assistant, image capture system or device, an augmented reality system or device, a virtual reality system or device, a gaming system, an Internet of Things device, or a smart consumer device (such as a smart fridge or vacuum cleaner). It will be understood that this is a non-exhaustive and non-limiting list of example client devices.

In a third approach of the present techniques, there is provided a computer-implemented method, performed by a server, for training a global ML model for automatic speech recognition, ASR, the method comprising: generating the global ML model by injecting, into a neural network which has a plurality of layers and which is for performing ASR, at least one speaker anonymizer module between layers of the neural network; obtaining a first training dataset comprising a plurality of privacy-enhanced embedding vectors, each privacy-enhanced embedding vector representing an utterance spoken by a speaker of a first plurality of speakers; obtaining a second training dataset comprising a plurality of audio data items, each audio data item containing an utterance spoken by a speaker of a second plurality of speakers; training the global ML model by jointly: training the neural network, using the second training dataset, to extract acoustic features from the audio data items and generate, using the extracted acoustic features, embedding vectors representing the utterance within each audio data item; and training the at least one speaker anonymizer module to generate, using the generated embedding vectors and the first training dataset, privacy-enhanced embedding vectors which anonymise the speaker of each utterance.

The first training dataset comprises many privacy-enhanced embedding vectors. Each privacy-enhanced embedding vector in the first training dataset has been created using an audio data item comprising an utterance spoken by one speaker of a first plurality of speakers. Each utterance may be the same or different. That is, in some cases, each of the plurality of speakers may have been asked to speak the same phrase (e.g. "Hi Bixby"), such that the utterances collected from each speaker is the same in terms of the words spoken. In other cases, each of the plurality of speakers may speak any phrase. Multiple utterances may be obtained from the same individual speakers, such that the first training dataset comprises more privacy-enhanced embedding vectors than the number of speakers. The first plurality of speakers may be individuals who have been contacted to partake in the training process.

The second training dataset comprises many audio data items. Each audio data item in the second training dataset may be obtained from a public dataset. Each audio data item comprises an utterance spoken by one speaker of a second plurality of speakers. Thus, the second plurality of speakers and first plurality of speakers may be different individuals. Each utterance may be the same or different. That is, in some cases, each of the plurality of speakers may have been asked to speak the same phrase (e.g. "Hi Bixby"), such that the utterances collected from each speaker is the same in terms of the words spoken. In other cases, each of the plurality of speakers may speak any phrase. Multiple utterances may be obtained from the same individual speakers, such that the second training dataset comprises more audio data items than the number of speakers.

The speaker anonymiser module is a module which is inserted into a baseline or backbone model for performing ASR during training, and provides the baseline model with the ability to anonymise speakers. This avoids needing to construct a whole new model from scratch that has the ability to perform both ASR and speaker anonymisation. The speaker anonymiser module is used, during training of the ML model, to enable the model to generate privacy-enhanced embedding vectors (also referred to as anonymised embeddings). Once trained, the speaker anonymiser module is removed from the trained model, because the backbone model has learned how to generate the anonymised embeddings itself. The speaker anonymiser module is a speaker classifier, which is able to predict who a speaker is from an embedding encoding speech spoken by a speaker. For example, if an audio data item contains speech from speaker A, the ML model generates an embedding vector for the speech, and the speaker anonymiser module tries to determine, from the embedding vector, who the speaker is or what the speaker's voice characteristics are. The better the speaker anonymiser module is at predicting who the speaker is, the worse the anonymisation. Thus, the goal of the training is to use the speaker anonymiser module to improve the anonymisation (by making it more difficult for the module to predict the speaker). The speaker anonymiser module can be built and trained separately, and then inserted into existing ASR models. The speaker anonymiser module may itself be an ML model that is trained to perform speaker classification. The module is described in more detail below with respect to the Figures.

Training the at least one speaker anonymiser module to generate privacy-enhanced embedding vectors may comprise: training the at least one speaker anonymiser module to remove speaker-identifying audio information from the generated embedding vectors. As explained in more detail below, the speaker-identifying audio information is any information that identifies the speaker, and may include any one or more of the following: speaker identifier, prosody, pitch, and speaking style. It will be understood that this is a non-exhaustive list of example characteristics or information that could be removed from the audio data item to anonymise the speaker. It will also be understood that the ML model is trained to recognise such characteristics or information and to remove them.

Training the at least one speaker anonymiser module may comprise training the at least one speaker anonymiser module to identify and remove any one or more of the following from the generated embedding vectors: prosody, pitch, speaking style, speed, and volume.

Training the at least one speaker anonymiser module to generate at least one privacy-enhanced embedding vector may comprise: training the at least one speaker anonymiser module to remove background noise from the audio data item so that the generated at least one privacy-enhanced embedding vector only represents the utterance spoken by the speaker.

Training the at least one speaker anonymiser module may further comprise: training the at least one speaker anonymiser module to augment the generated at least one privacy-enhanced embedding vector, in embedding space to further anonymise the speaker. As mentioned above, the augmenting may be performed for two purposes. One is to further anonymise speakers at inference time. In this case, the client device may use the trained model to perform the augmentation, such that augmented privacy-enhanced embedding vectors are sent from the client device to the server for processing. Another purpose is to update the trained model using more data. In this case, either the client device performs the augmentation, or the server performs the augmentation on privacy-enhanced embedding vectors received from the client device. In both cases, the augmentation is being performed on the privacy-enhanced embedding vectors, rather than the raw audio signal/waveform. However, it will be understood that this is particularly relevant when the augmentation is performed on the server, because the server does not have access to the raw audio signal/waveform.

Training the at least one speaker anonymiser module to augment the generated at least one privacy-enhanced embedding vector may comprise training the at least one speaker anonymiser module to add at least one of the following to the generated at least one privacy-enhanced embedding vector: noise and reverberation.

Training the at least one speaker anonymiser module to augment the generated at least one privacy-enhanced embedding vector may comprise training the at least one speaker anonymiser module to alter spectral information and/or time information contained within the at least one privacy-enhanced embedding vector.

The neural network may comprise an encoder and a decoder, each having a plurality of layers. Injecting at least one speaker anonymiser module may comprise injecting at least one speaker anonymiser module between layers of the encoder.

Injecting at least one speaker anonymiser module may comprise injecting a plurality of speaker anonymiser modules between different layers of the encoder. That is, multiple speaker anonymiser modules may be injected at different layers of the encoder. This may be performed to improve the anonymisation level (i.e. the extent to which the embedding is anonymised). This is explained in more detail below with reference to the drawings.

Training the at least one speaker anonymiser module may comprise training the plurality of speaker anonymiser modules to generate privacy-enhanced embedding vectors.

The training method may further comprise: generating a local ML model suitable for use by a plurality of client devices by: creating a copy of the global ML model after the training has been performed; and removing the at least one speaker anonymiser module from the copy of the global ML model. Removing the at least one speaker anonymiser module after the step of training the ML model (i.e., as a final step to make the model ready for deployment on a client device), may reduce the overall size of the model, thereby saving storage space on the client device. This allows the model to be deployed on a wide range of devices with varying hardware capabilities (e.g. processing power and memory). The or each speaker anonymiser module can be removed after training because it has already served its purpose of training the layer to which the module is appended to learn how to generate anonymised embeddings.

The training method may further comprise: transmitting the local ML model to a plurality of client devices for use to perform on-device ASR.

In a fourth approach of the present techniques, there is provided a server for training a global ML model for automatic speech recognition, ASR, the server comprising: at least one processor coupled to memory, configured for: generating the global ML model by injecting into a neural network having a plurality of layers and for performing ASR, at least one speaker anonymiser module between layers of the neural network; obtaining a first training dataset comprising a privacy-enhanced embedding vectors, each privacy-enhanced embedding vector representing an utterance spoken by a speaker of a plurality of speakers; obtaining a second training dataset comprising a plurality of audio data items, each audio data item containing an utterance spoken by a speaker of a plurality of speakers; training the global ML model by jointly: training the neural network, using the second training dataset, to extract acoustic features from the audio data items and generate embedding vectors representing the utterance within each audio data item; and training the at least one speaker anonymiser module to generate, using the generated embedding vectors and the first training dataset, privacy-enhanced embedding vectors which anonymise the speaker of each utterance.

The features described above with respect to the third approach apply equally to the fourth approach and therefore, for the sake of conciseness, are not repeated.

In a fifth approach of the present techniques, there is provided a system for automatic speech recognition, ASR, the system comprising: a server storing a global machine learning, ML, model for ASR; and a plurality of client devices, each client device comprising: a microphone arranged to capture an audio data item containing an utterance spoken by a speaker; and at least one processor coupled to memory, arranged for: generating, using a trained machine learning, ML, model on the client device, at least one privacy-enhanced embedding vector for the audio data item, wherein the at least one privacy-enhanced embedding vector anonymises the speaker; transmitting the at least one privacy-enhanced embedding vector to the server for processing by the global ML model on the server; receiving, from the server, a processing result output by the global ML model for the at least one privacy-enhanced embedding vector that enables the client device to perform ASR.

The features described above with respect to the first to fourth approaches apply equally to the fifth approach and therefore, for the sake of conciseness, are not repeated.

In an example, the speaker anonymiser module comprises a negative gradient layer (i.e., which is injected into the ML model) and, optionally, a speaker classifier, by which the speaker anonymiser suitably enforces anonymous representations for the ML model.

In an example, the ML model and speaker anonymiser module are jointly optimised by joint representation learning. That is, the ML model is not pre-trained prior to the injection of the speaker anonymiser. Notably, prior art techniques typically require the use of a pre-trained ASR network and the separate removal of speaker information. The present techniques allow for a far more efficient approach.

In an example, the ML model may comprise encoder layers and decoder layers, and the speaker anonymiser module may be suitably injected to an encoder layer, for example a third encoder layer (where the ML comprises at least encoder layers, in sequence). In this way good balance between accuracy of the ASR result and speaker anonymisation may be achieved.

In a related approach of the present techniques, there is provided a computer-readable storage medium comprising instructions which, when executed by a processor, causes the processor to carry out any of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog (RTM) or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The method described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

BRIEF DESCRIPTION OF THE DRAWINGS

Implementations of the present techniques will now be described, by way of example only, with reference to the accompanying drawings, in which:

FIG. 2 is a flowchart of example steps, at a client device, to perform ASR using the present techniques;

FIG. 3 is a flowchart of example steps, at a server, to perform ASR using the present techniques;

FIG. 4 is a flowchart of example steps, at a client device, during training of an ML model by a server;

FIG. 5 is a flowchart of example steps, at a server, during training of an ML model by the server;

FIG. 18 is a table of data from experiments to assess ASR performance of the present techniques;

FIG. 19 is a table of data from experiments to assess speaker accuracy; and

DETAILED DESCRIPTION

Broadly speaking, embodiments of the present techniques provide an improved technique for automatic speech recognition using a machine learning (ML) model. Advantageously, the present techniques allow for use of a large, high accuracy, model, as might be deployed on a server, while offering both private training and inference of the ML model. In particular, it is an aim of the present techniques to enable a transfer of privatized embeddings between a cloud (server) part of an automatic speech recognition (ASR) model and an on-device part of the model.

As noted above, voice assistants are generally trained with voice recordings collected from users, i.e. recordings of utterances spoken by individuals using those voice assistants (or other services/devices provided by providers of the voice assistants). However, this is not privacy-preserving, because the raw audio recording is transmitted off-device to a server. Ideally, to preserve user privacy, raw audio data should not be transmitted off-device and data privacy should be enhanced during the training of voice assistants.

Figure 1A:
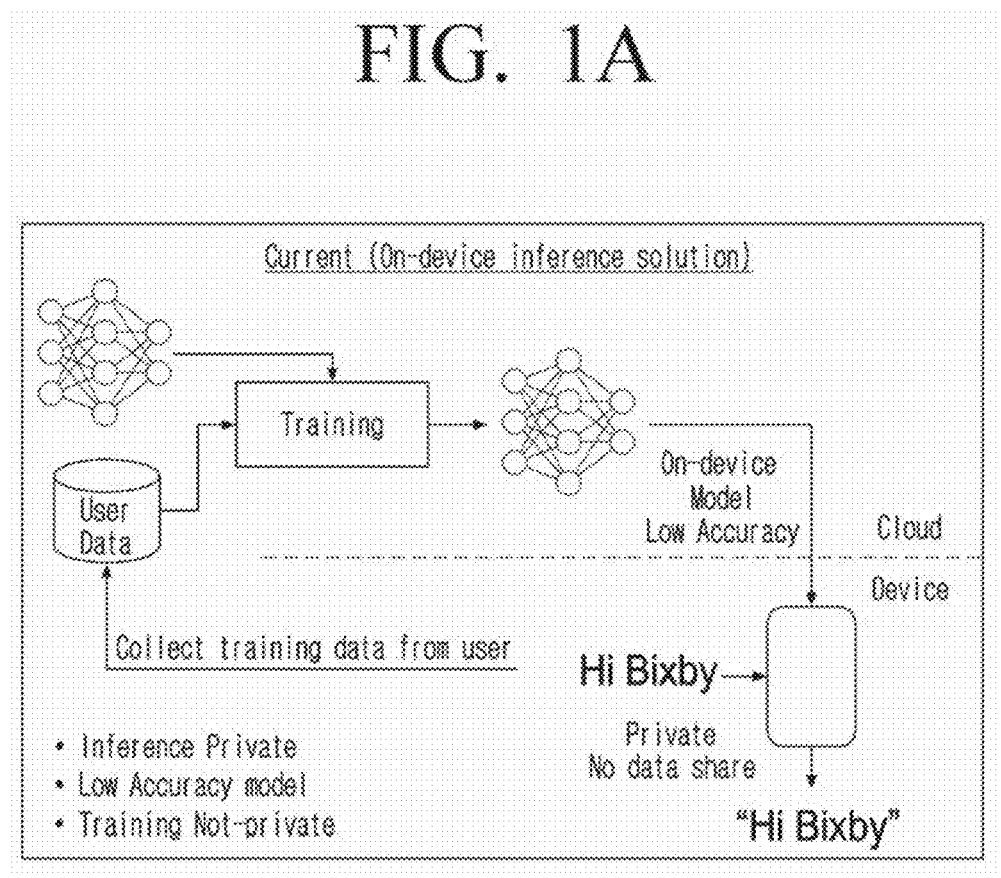
FIG. 1A is a diagram illustrating problems associated with current on-device inference techniques for performing automatic speech recognition (ASR)

FIG. 1A is a diagram illustrating problems associated with current on-device inference techniques for performing automatic speech recognition (ASR). When a trained ML model is deployed on-device, i.e. on an end-user device such as a smartphone, the inference process may be good from a privacy perspective because the ML model is on the same device that obtains the audio/voice data. However, generally the ML model will not be as accurate as an ML model on a server, because the on-device ML model will likely need to be built to suit the constrained resources of the device, such as lower processing power compared to a server. As a result, the accuracy of the ASR may be lower than if a server is used to process the audio data. Typically, the training of ML model will have involved sending utterances of the user to the server too, which is not ideal as explained above.

Figure 1B:
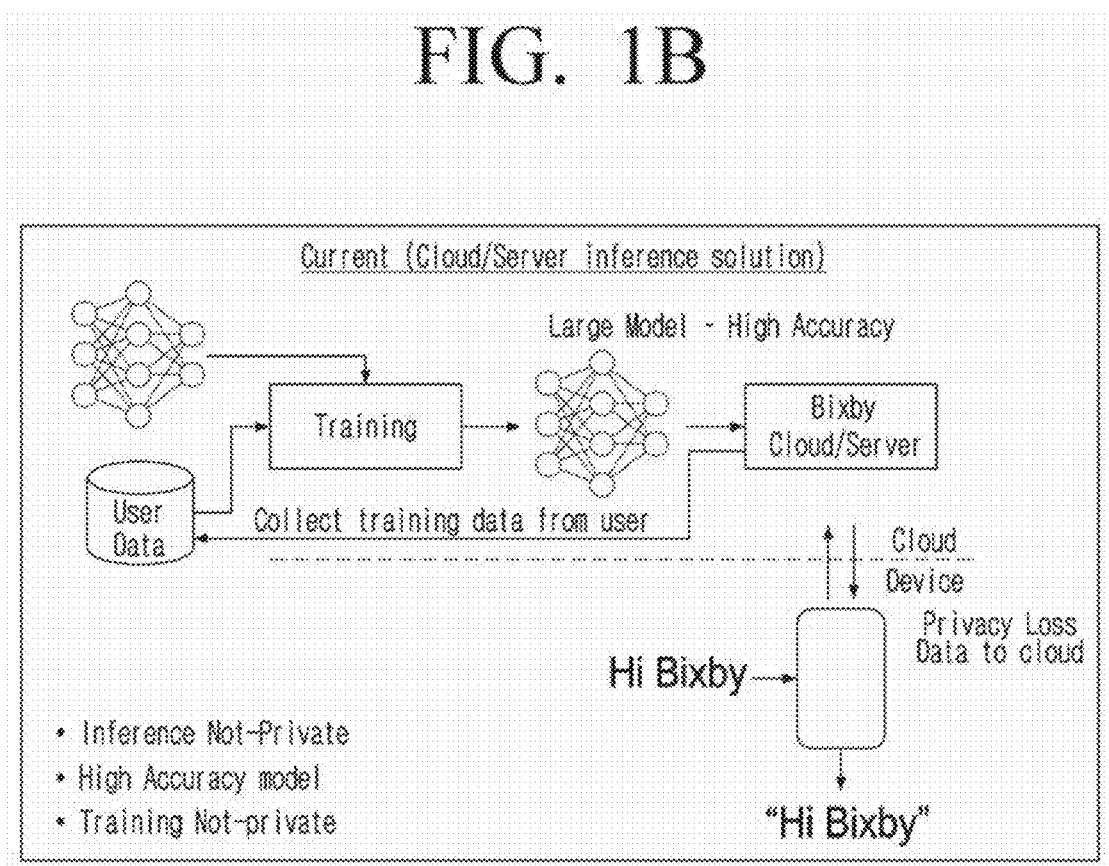
FIG. 1B is a diagram illustrating problems associated with current server-based inference techniques for performing ASR.

FIG. 1B is a diagram illustrating problems associated with current server-based inference techniques for performing ASR. When a trained ML model is located on a server, utterances obtained by an end-user device, such as a smartphone, will be sent to the server for processing. However, this typically involves sending the raw utterances, which means that the user's privacy is not preserved. Although the model on the server will likely be more accurate, both the inference and training of that model do not preserve the privacy of users of the end-user devices.

Figure 1C:
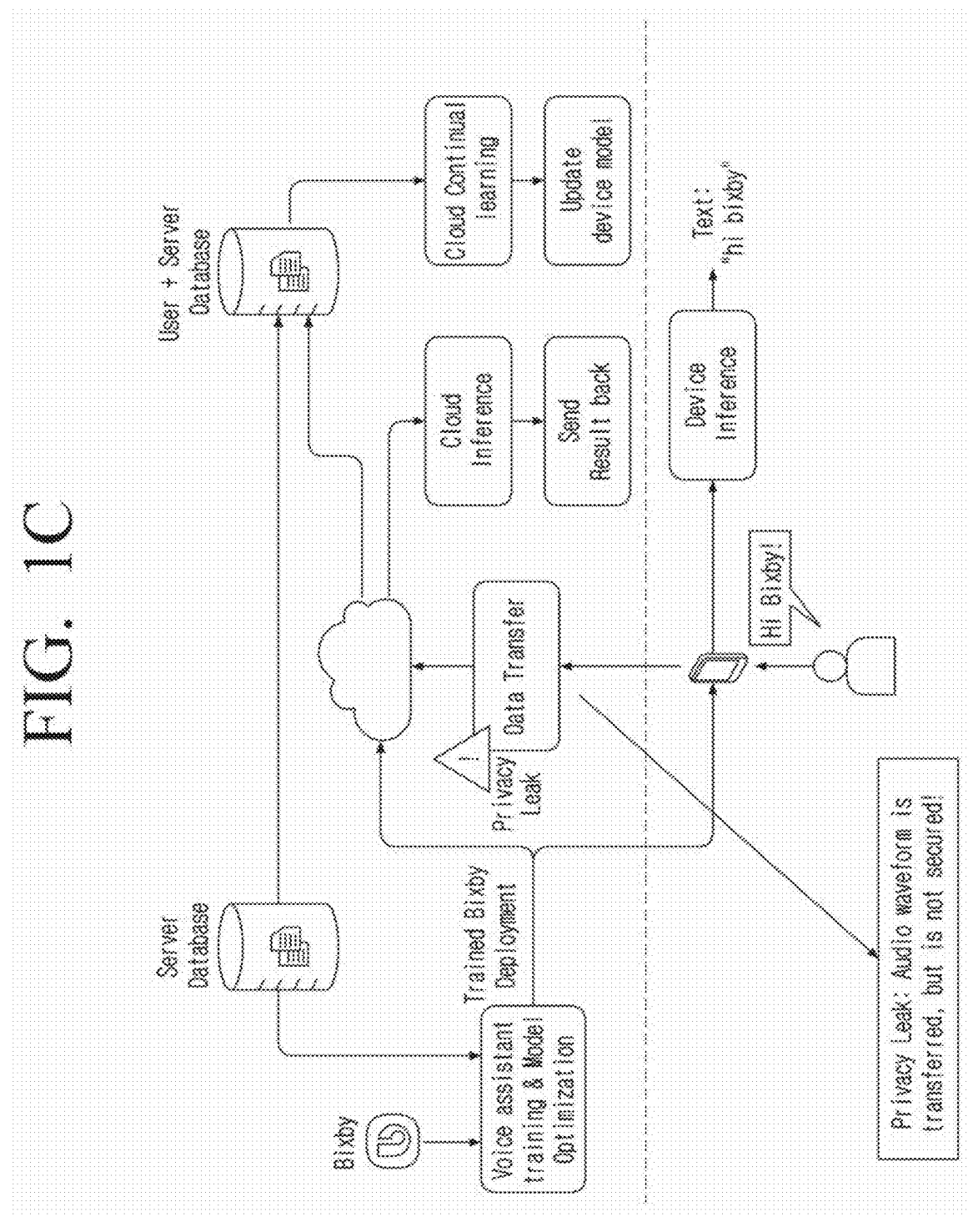
FIG. 1C is a diagram illustrating problems associated with current distributed training and inference techniques for performing ASR.

FIG. 1C is a diagram illustrating problems associated with current distributed training and inference techniques for performing ASR. In this system, the server performs initial model training, inference, and continual updating of the model using data received from users. The end-user devices deploy a trained model and use it for inference, but this may result in low accuracy outputs. If the end-user devices send utterances to the server for analysis during inference, then there is a privacy issue because raw audio waveforms are transmitted. Similarly, such utterances may be sent to the server for the initial training and/or subsequent model updates.

FIG. 2 is a flowchart of example steps, at an end-user, electronic client device, to perform ASR using the present techniques. The method performed by the client device comprises: obtaining an audio data item containing an utterance spoken by a speaker (step S100); generating, using a trained machine learning, ML, model on the client device, at least one privacy-enhanced embedding vector for the audio data item which anonymises the speaker (step S102); transmitting the at least one privacy-enhanced embedding vector to a server for processing by a global machine learning, ML, model on the server (step S104); and receiving, from the server, a processing result output by the global ML model for the at least one privacy-enhanced embedding vector that enables the client device to perform ASR (step S106).

Step S102 to generate the privacy-enhanced embedding vectors may be implemented in a number of ways. For example, Generating the at least one privacy-enhanced embedding vector may comprise: removing, using the trained ML model, audio information from the audio data item that identifies the speaker, so that the generated at least one privacy-enhanced embedding vector anonymises the speaker. As explained in more detail below, the audio information that identifies the speaker, and which is removed by the trained ML model, may include any one or more of the following: speaker identifier, prosody, pitch, and speaking style. It will be understood that this is a non-exhaustive list of example characteristics or information that could be removed from the audio data item to anonymise the speaker. It will also be understood that the trained ML model may have been trained to recognise such characteristics or information and to remove them.

In another example, the step S102 of generating at least one privacy-enhanced embedding vector may comprise: removing, using the trained ML model, background noise from the audio data item so that the generated at least one privacy-enhanced embedding vector only represents the utterance spoken by the speaker. Background noise may contain information that could identify the speaker or contain other utterances that are private. For example, if the background noise contains utterances from a conversation between other members of the speaker's household or workplace, the utterances themselves may be private or contain sensitive/confidential information, or may reveal the identity of the speaker, or may reveal information about the speaker (such as where they work, who they live with, etc.) This is described in more detail below with reference to FIG. 9.

The method may further comprise: augmenting, using the trained ML model, the generated at least one privacy-enhanced embedding vector, in embedding space to further anonymise the speaker. That is, after the at least one privacy-enhanced embedding vector has been generated, the method may augment the embedding vector to alter the embedding vector, which helps to anonymise the speaker even more. The augmentation may occur in embedding space, i.e. the space of the embedding vectors that represent the audio data items. In embedding spaces, embedding vectors which are similar are positioned closer to each other. In other words, the augmentation happens after the embedding vector has been generated, rather than on the original audio signal of the audio data item. This is in contrast to existing techniques, where data augmentation is commonly applied to the raw signal speech signal. The augmentation is described in more detail with reference to FIGS. 14 and 15 below.

FIG. 3 is a flowchart of example steps, at a server, to perform ASR using the present techniques. The method performed by the server comprises: receiving, from a client device (c.f. step S104 in FIG. 2), at least one privacy-enhanced embedding vector corresponding to an audio data item which anonymises the speaker (step S102); processing, using a global machine learning, ML, model on the server, the at least one privacy-enhanced embedding vector to generate a processing result (step S202); and transmitting, to the client device, a processing result output by the global ML model for the at least one privacy-enhanced embedding vector that enables the client device to perform ASR (step S204). The processing result may be a final ASR output (output from a decoder of the global ML model), or may be an intermediate processing result which the client device can use to complete the ASR process on-device. For example, the intermediate processing result may be input into a decoder of the ML model on the client device to generate a final ASR output.

Training of the ML model occurs on the server and may comprise using two sets of training data. As explained below, one training dataset may be obtained from public voice datasets. The server will have a public voice dataset, which comprises raw audio data/waveforms containing speech. This data will be passed through the ML model so that the ML model can learn how to generate privacy-enhanced embedding vectors. Another dataset may be obtained from client devices—this dataset comprises privacy—enhanced embedding vectors only from the client devices (i.e. no corresponding raw audio data). That is, the training is performed on the server, but the client device(s) help to provide training data for the training.

FIG. 4 is a flowchart of example steps, performed by a client device, during training of a global ML model for ASR. As noted above, the client devices coupled to the server help to generate one of the training datasets used during training. The method performed by the client device comprises: obtaining at least one audio data item containing an utterance spoken by a speaker (step S300); generating, using a machine learning, ML, model on the client device, at least one privacy-enhanced embedding vector for the audio data item which anonymises the speaker (step S302); and transmitting the at least one privacy-enhanced embedding vector to a server for use during training of the ML model on the server (step S304). Thus, the client device may have a partially-trained or trained ML model for use to generate privacy-enhanced embedding vectors, but the transmission of these to the server may help the server to fully train or further train the ML model.

FIG. 5 is a flowchart of example steps, performed by a server, for training a global ML model for automatic speech recognition, ASR. The method performed by the server comprises: generating the global ML model by injecting into a neural network having a plurality of layers and for performing ASR, at least one speaker anonymiser module between layers of the neural network (S400); obtaining a first training dataset comprising a privacy-enhanced embedding vectors, each privacy-enhanced embedding vector representing an utterance spoken by a speaker of a plurality of speakers (S402); obtaining a second training dataset comprising a plurality of audio data items, each audio data item containing an utterance spoken by a speaker of a plurality of speakers (S404); training the global ML model by jointly: training the neural network, using the second training dataset, to extract acoustic features from the audio data items and generate embedding vectors representing the utterance within each audio data item (S406); and training the at least one speaker anonymiser module to generate, using the generated embedding vectors and the first training dataset, privacy-enhanced embedding vectors which anonymise the speaker of each utterance (S408). As indicated by the arrow between steps S406 and S408, these training steps are performed jointly.

Figure 8:
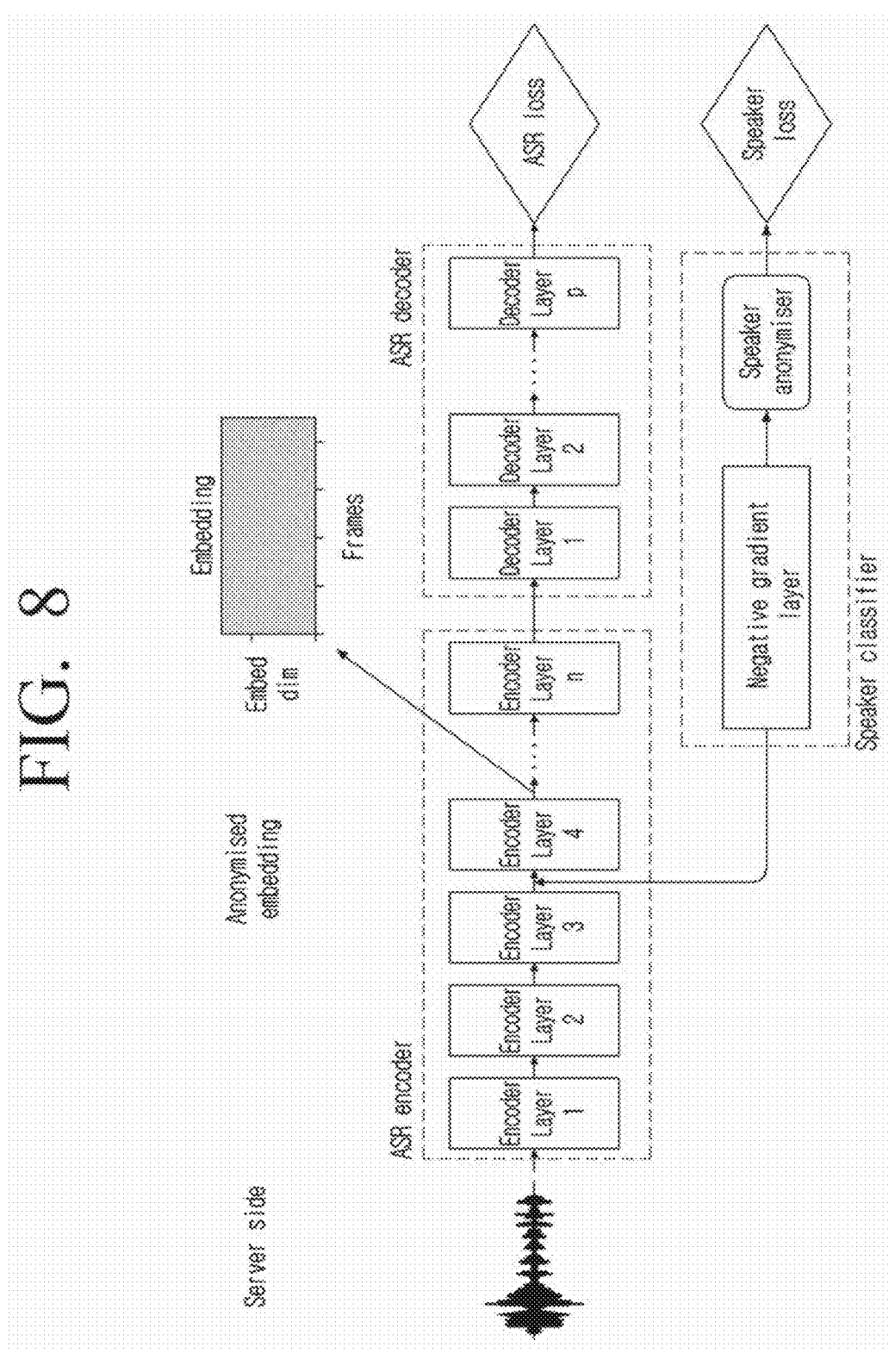
FIG. 8 is a schematic diagram showing further details of the training of the present ML model.

With respect to step S400, the at least one speaker anonymiser module is inserted into the backbone model and used to train the backbone model to generate privacy-enhanced/anonymised embeddings. That is, the backbone model is able to generate embeddings for input audio data items but is not able to generate anonymised embeddings. The speaker anonymiser module(s) is used to train the backbone model to perform two functions-generate the embeddings, and anonymise them. The speaker anonymiser module(s) is then removed from the model when it is deployed for use (by both client device and server). Thus, as mentioned below with respect to FIG. 8, the at least one speaker anonymiser module is only used during training, to train the neural network to perform the anonymisation function. The speaker anonymiser module is used to enable the backbone model to learn how to generate anonymised embeddings. Specifically, as shown in FIG. 8, the speaker anonymiser module may be connected to a specific layer of the neural network, and functions to train that specific layer (and previous ones) to output anonymised embedding vectors. Once this training has been performed, the module can be removed. Referring to FIG. 8, the first three encoder layers are forced to create anonymised embedding vectors because, while training, the speaker anonymiser module is connected to the output of the third layer. The speaker anonymiser module is basically a speaker classifier that is able to estimate the speaker identity (or voice characteristics at least) from the embeddings generated by the layer to which the module is connected (e.g. layer three in the example of FIG. 8). Then in the backpropagation of the loss (when the model weights are updated to learn from data) there is a gradient reversal. This gradient reversal is making the layer learn to not distinguish between speakers rather than distinguish between speaker (as it would normally do without a gradient reversal). In other words, the model is being taught to remove information from the embedding vectors which could be used to identify speakers.

The details of the present techniques are now described.

Figure 6:
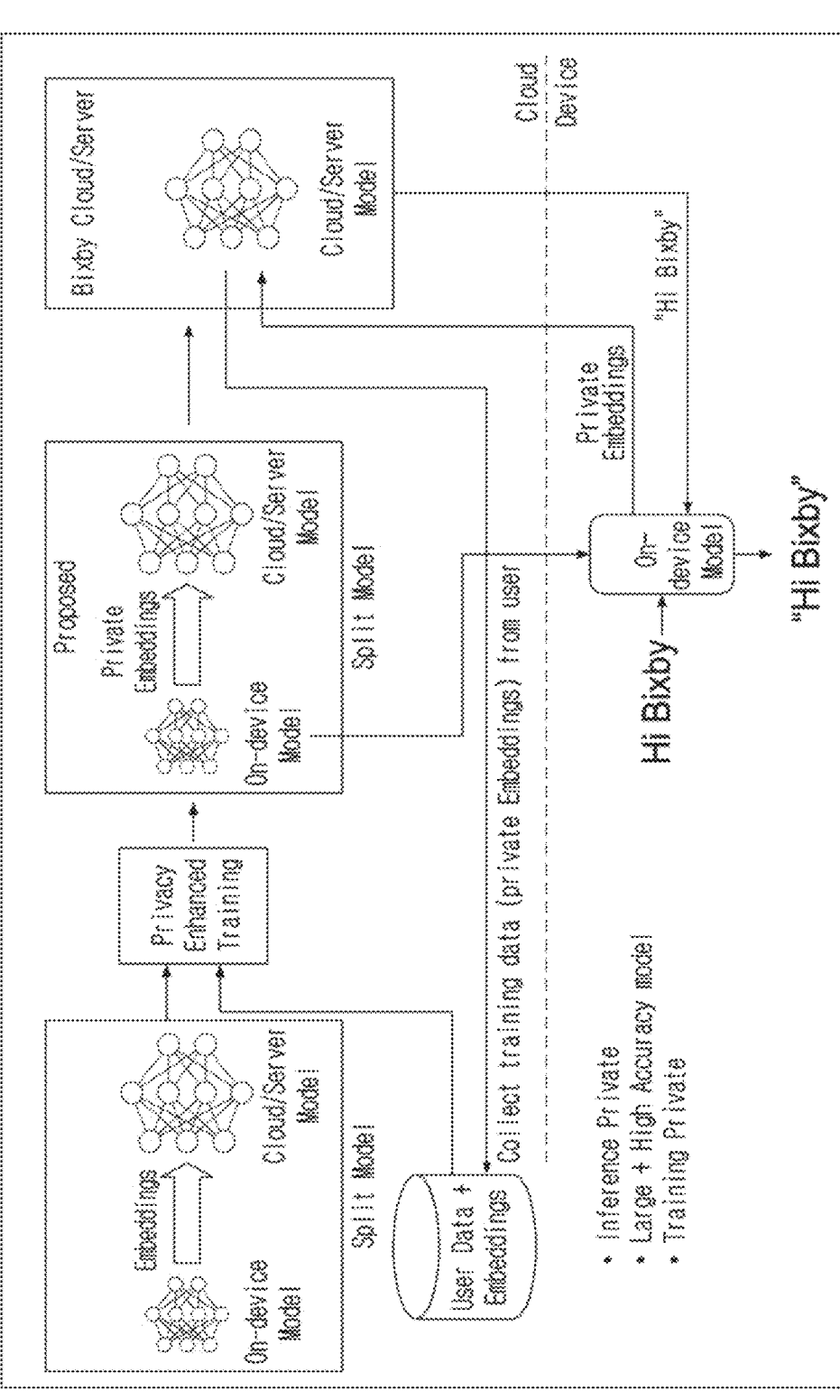
FIG. 6 is a high-level schematic diagram of the present framework for training an ML model.

FIG. 6 is a high-level schematic diagram of the present framework for training an ML model. The present framework provides split model inference and training, i.e. split between server and client devices, but in a privacy-enhanced manner. The full ASR model is split into a part that is on the server and a part that is on-device. Instead of sending the raw acoustic data from the client devices to the server, the present techniques involve sending privacy-enhanced embedding vectors representing what speakers say, but not necessarily how they have said it. In this way, aspects of the utterances which represent the user's vocal characteristics, such as accent, pitch, volume, prosody, and so on, are removed by the client device before transmission to the server for processing (either during training of the ML model or during inference). The on-device part of the full ASR model is deployed on client devices such as, but not limited to, smartphones. The server part of the full ASR model is deployed on a central server, such as a cloud server.

During inference, user utterances received by the user device are processed by the on-device part of the full ASR model, so that the utterances can be converted into private embeddings, i.e. privacy-enhanced embedding vectors. These private embeddings are then transmitted to the server for processing, i.e. to perform the ASR. The server part of the full ASR model receives the private embeddings, processes them to perform ASR, and transmits an ASR result back to the user device. The server part of the model is a large and high accuracy model that could not be deployed on resource-constrained devices such as smartphones. Advantageously, the present techniques enable high accuracy ASR, while also ensuring user privacy is maintained.

During training of the ASR model, the whole model (both the part that will be deployed on-device and the part that will remain on the server) is trained on the server using some private embeddings received from users. No raw audio data corresponding to the private embeddings is sent to the server. Public voice data is also used to train the ASR model.

The training process ensures that private information is removed from utterances (by the part that will be deployed on-device part) and that there is no loss in overall model accuracy.

Figure 7:
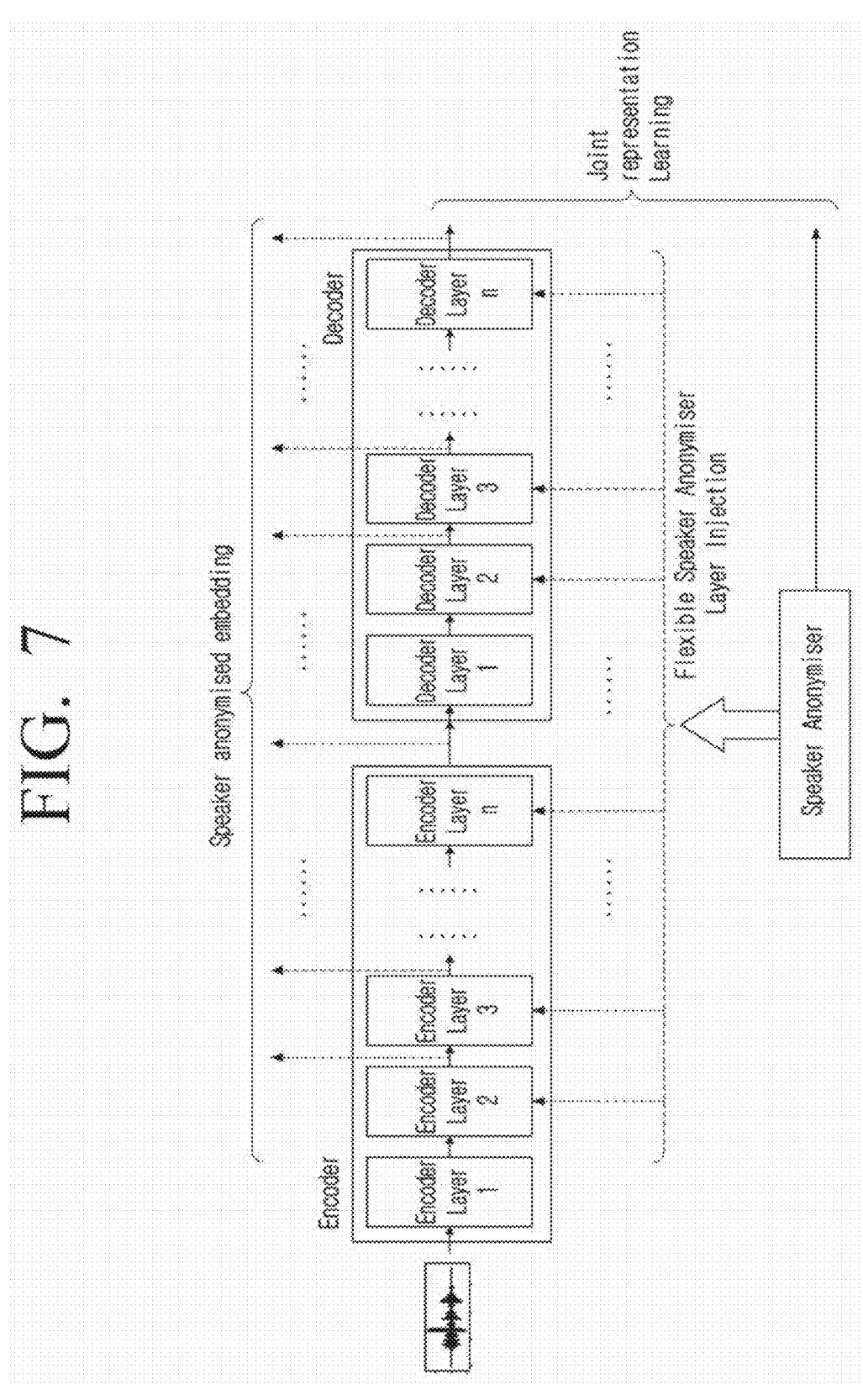
FIG. 7 is a schematic diagram showing the training of the present ML model and at least one speaker anonymiser module.

FIG. 7 is a schematic diagram showing the training of the present ML model and at least one speaker anonymiser module. The present privacy-enhanced training framework employs at least one speaker anonymiser module, which is injected at different layers of the neural network forming the ML model. That is, there may be a single speaker anonymiser module, or multiple speaker anonymiser modules at different positions within the neural network. The speaker anonymiser module(s) may be provided as a gradient reversal layer. The speaker anonymiser module(s) and the backbone ASR model are preferably optimised together using joint representation learning, which is a multi-task learning of speech recognition and speaker classification. Once trained, the speaker anonymiser module(s) is removed from the trained model.

FIG. 8 is a schematic diagram showing further details of the training of the present ML model. The ASR backbone model comprises an encoder and a decoder. The encoder and decoder may each comprise multiple neural network layers. In this example, the speaker anonymiser module comprises a negative gradient layer and a speaker classifier. The negative gradient layer may be injected between neural network layers of the encoder of the ASR backbone model, as shown in FIG. 8. In one non-limiting example, the speaker anonymiser module may be injected after the third layer of the encoder of the ASR backbone model. As a result, subsequent layers of the ASR encoder operate on a privacy-enhanced embedding vectors. The speaker anonymiser module is used, during training of the ML model, to enable the model to generate privacy-enhanced embedding vectors (also referred to as anonymised embeddings). Once trained, the speaker anonymiser module is removed from the trained model, because the backbone model has learned how to generate the anonymised embeddings itself. The speaker anonymiser module is a speaker classifier, which is able to predict who a speaker is from an embedding encoding speech spoken by a speaker. For example, if an audio data item contains speech from speaker A, the ML model generates an embedding vector for the speech, and the speaker anonymiser module tries to determine, from the embedding vector, who the speaker is or what the speaker's voice characteristics are. The better the speaker anonymiser module is at predicting who the speaker is, the worse the anonymisation. That is, if the speaker anonymiser module can determine that speaker A corresponds to an embedding vector (rather than speaker B or speaker C), then the anonymisation is not working very well. Thus, the goal of the training is to use the speaker anonymiser module to improve the anonymisation (by making it more difficult for the module to predict the speaker). That is, if the speaker anonymiser module cannot determine whether an embedding vector corresponds to speaker A or speaker B or speaker C, then the anonymisation works better.

As mentioned above, multiple speaker anonymiser modules may be injected into the backbone model during training. (Alternatively, the speaker anonymiser module may be injected at different positions during training.) During training, a privacy-enhanced embedding vector generated by one layer of the neural network of the backbone model is simply propagated to the subsequent layers, and so if there is another speaker anonymiser module is connected to one of those subsequent layers, the embedding vector is simply propagated as normal. During inference, it is desirable to be able to output a privacy-enhanced embedding vector from any of the layers of the encoder of the model. Using multiple speaker anonymiser modules during training enables multiple layers to be trained to anonymise the embeddings they generate. Which layer is used to output the privacy-enhanced embedding vector may depend on the level of privacy required (the later in the model, the more private/anonymised the embedding vector will be, as shown in FIG. 18) and the number of parameters that can be fine-tuned on the server side. (The parameters/layer used to generate the embeddings cannot be trained, so only the remaining parameters can be fine-tuned, such that if there are very few remaining parameters, the ASR improvement after fine-tuning might be limited).

Figure 9:
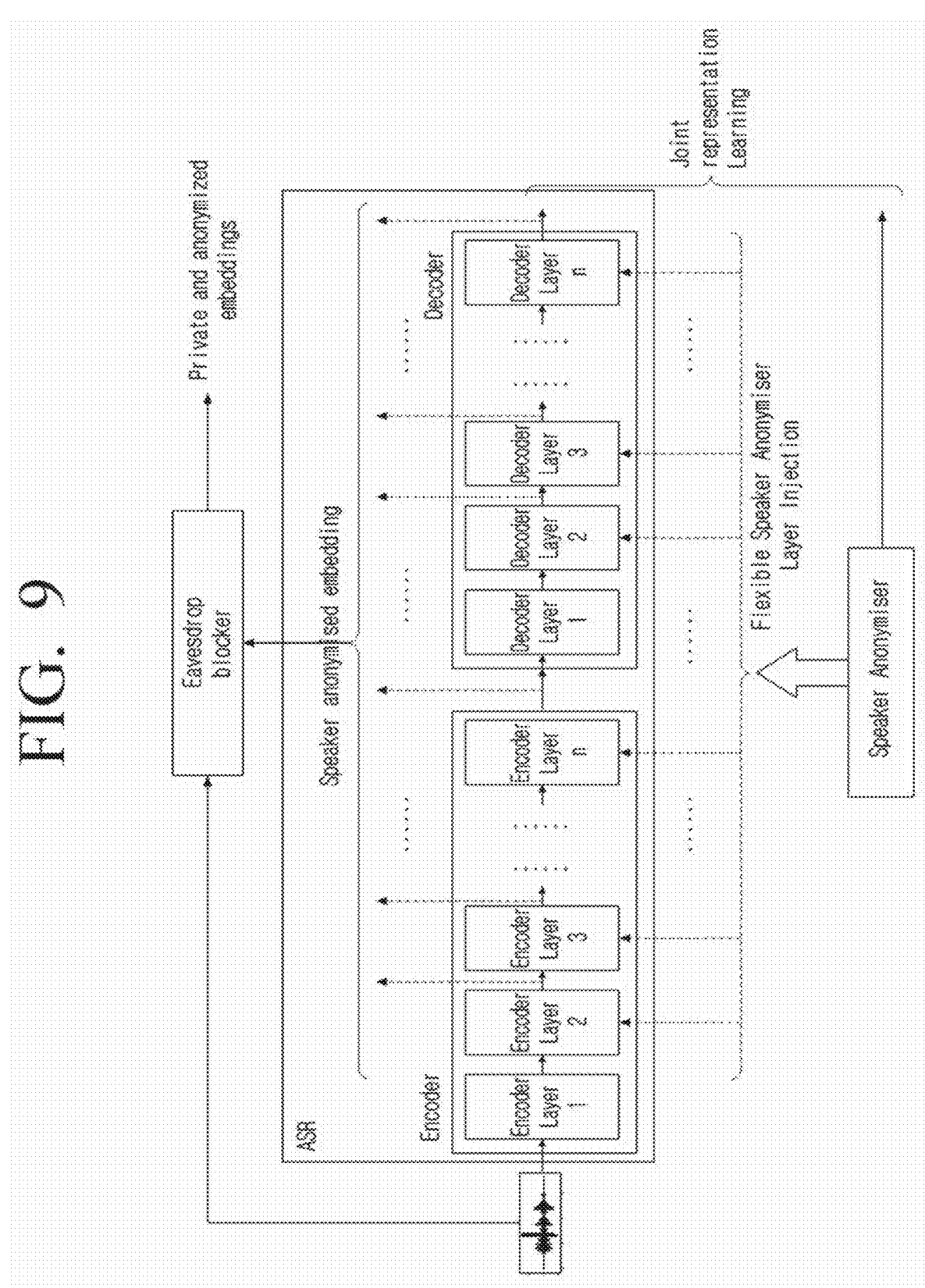
FIG. 9 is a schematic diagram showing a technique for anonymising speakers.

FIG. 9 is a schematic diagram showing a technique for anonymising speakers. As mentioned above, the privacy-enhanced embedding vector may have enhanced privacy by removing potential background conversations or noise so that the embedding vector sent to the server for processing (during training and/or inference) only contains the utterance spoken by a speaker. To do so, the ML model may comprise an eavesdrop blocker to remove, from the raw audio and/or the embedding vectors, any information which does not relate to the spoken utterance. As shown in FIG. 9, the eavesdrop blocker may act on the raw audio prior to this being input into the ML model for processing, and/or on any of the embedding vectors generated by the ASR encoder and decoder. Thus, generating at least one privacy-enhanced embedding vector may comprise: removing, using the trained ML model, background noise from the audio data item so that the generated at least one privacy-enhanced embedding vector only represents the utterance spoken by the speaker.

Figure 10:
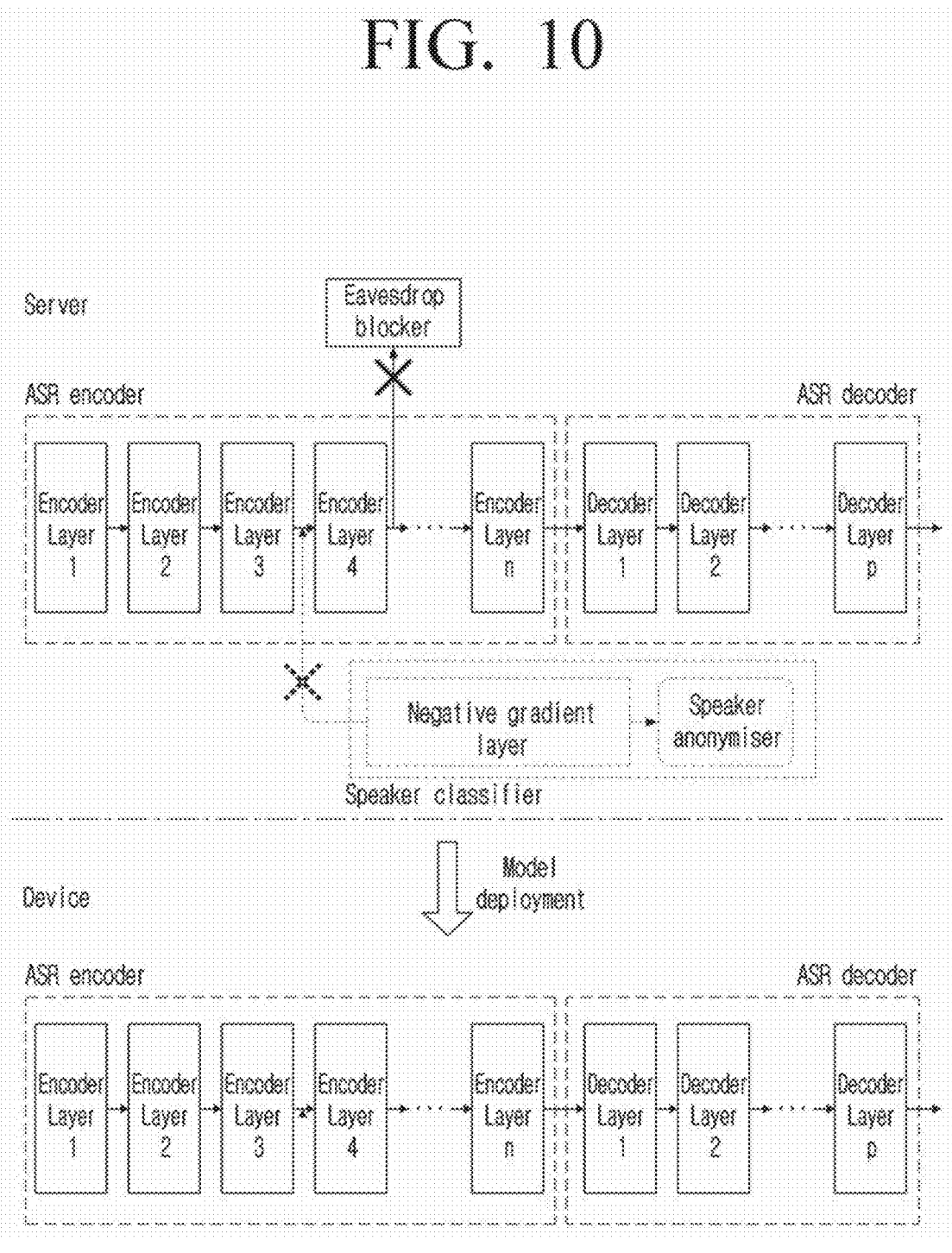
FIG. 10 is a schematic diagram showing how the trained ML model is adapted for use on-device.

FIG. 10 is a schematic diagram showing how the trained ML model is adapted for use on-device. After the privacy-enhanced training of the ML model, the at least one speaker anonymiser module and the eavesdrop blocker are detached from the model. In this way, only the original acoustic model is deployed on-device, and no extra modules are used by the client devices during inference. As explained above, the speaker anonymiser module(s) is not required for inference because the backbone model has been trained to generate anonymised embeddings. The speaker anonymiser module(s) is only use to train the layer to which it is connected to learn how to generate anonymised embeddings.

Figure 11:
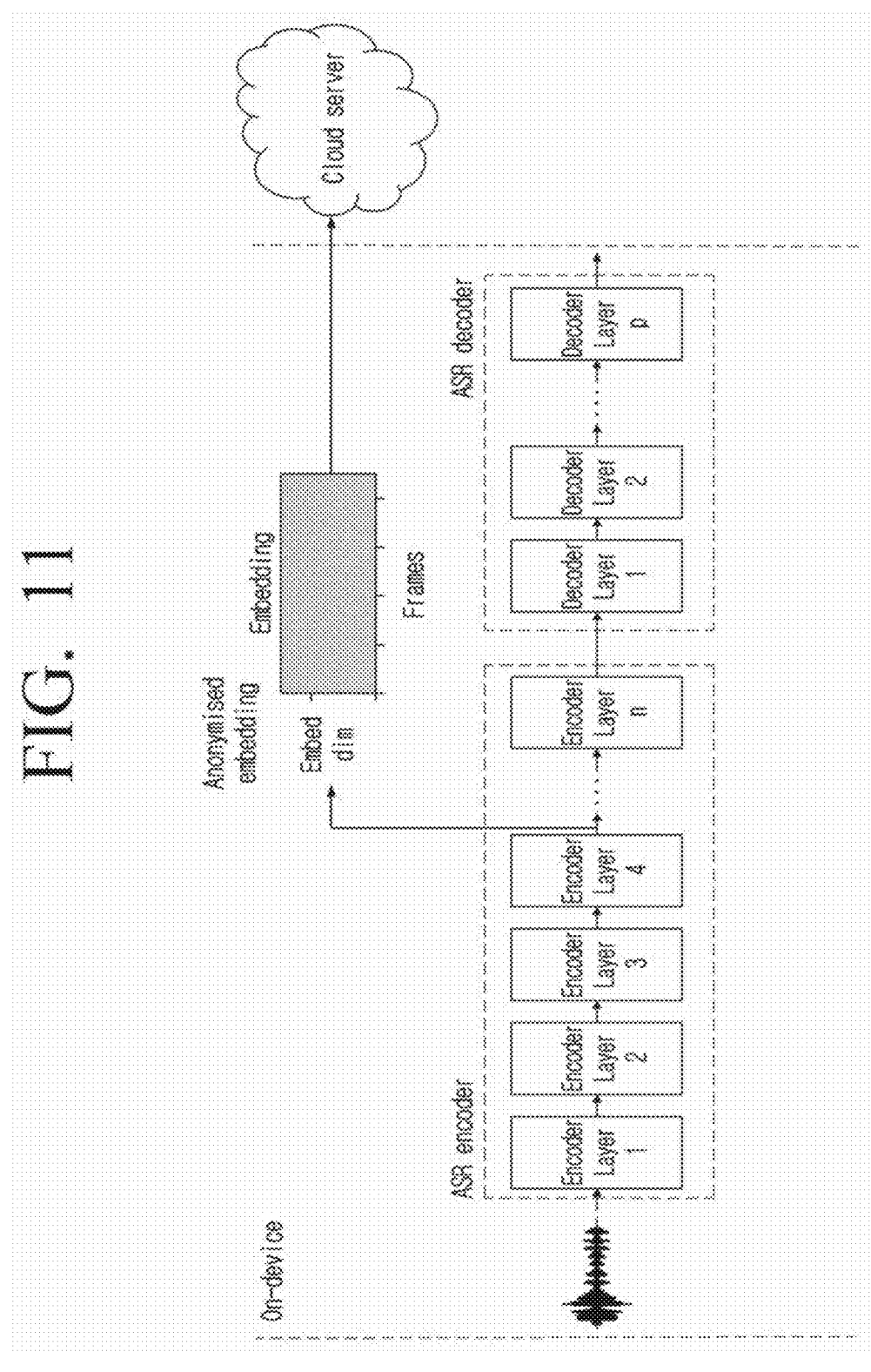
FIG. 11 is a schematic diagram showing how the trained ML model is used on-device.

FIG. 11 is a schematic diagram showing how the trained ML model is used on-device. At inference time, the trained ML model is used to generate privacy-enhanced embedding vectors for received audio data, and only these generated vectors are transmitted to the server for processing.

Figure 12:
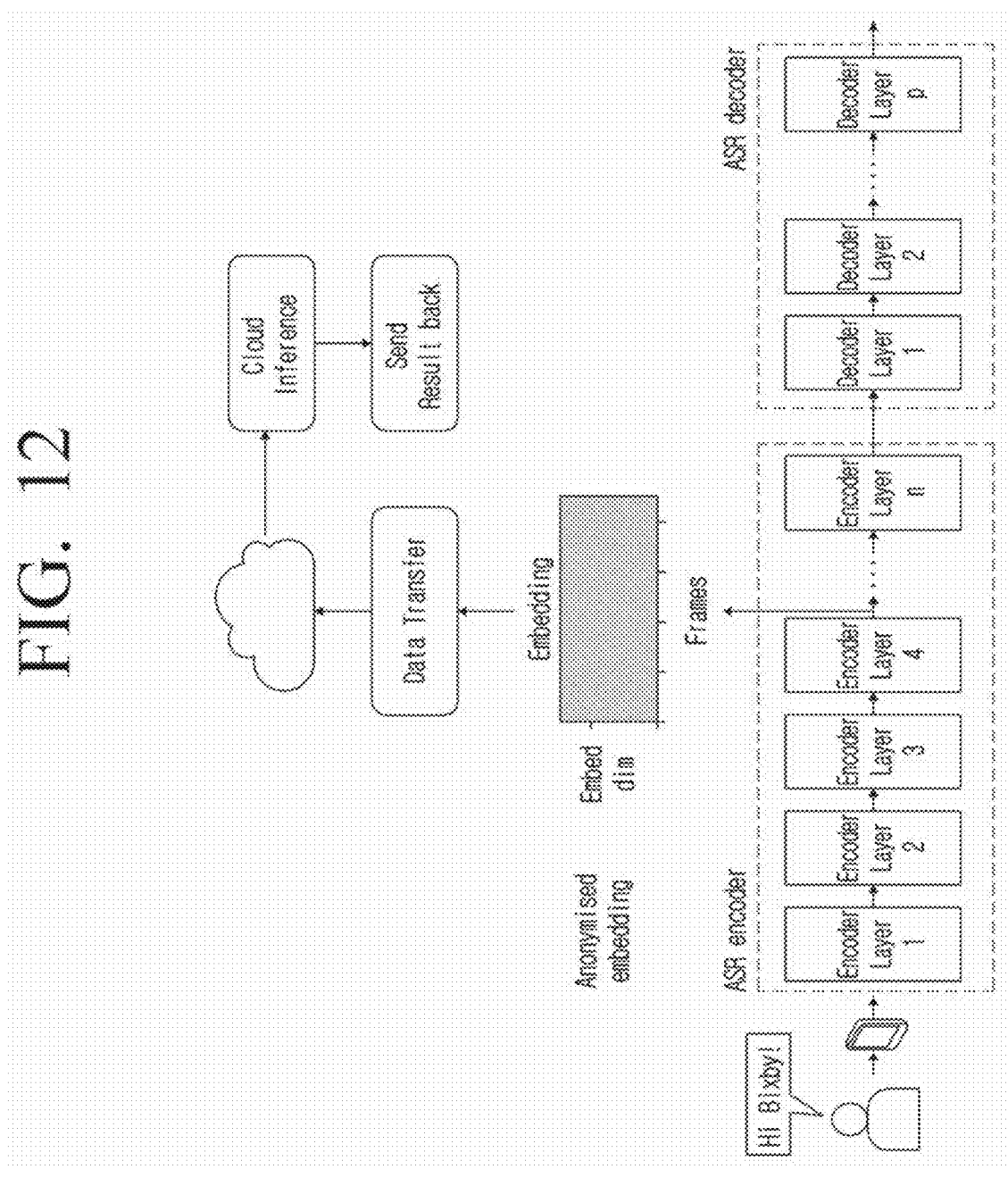
FIG. 12 is a schematic diagram showing how the trained ML model is used on-device to improve inference accuracy.

FIG. 12 is a schematic diagram showing how the trained ML model is used on-device to improve inference accuracy. As noted above, the present techniques transmit the privacy-enhanced embedding vectors to the server for processing by the server part of the trained ML model, to thereby leverage the power of the model on the server.

Figure 13:
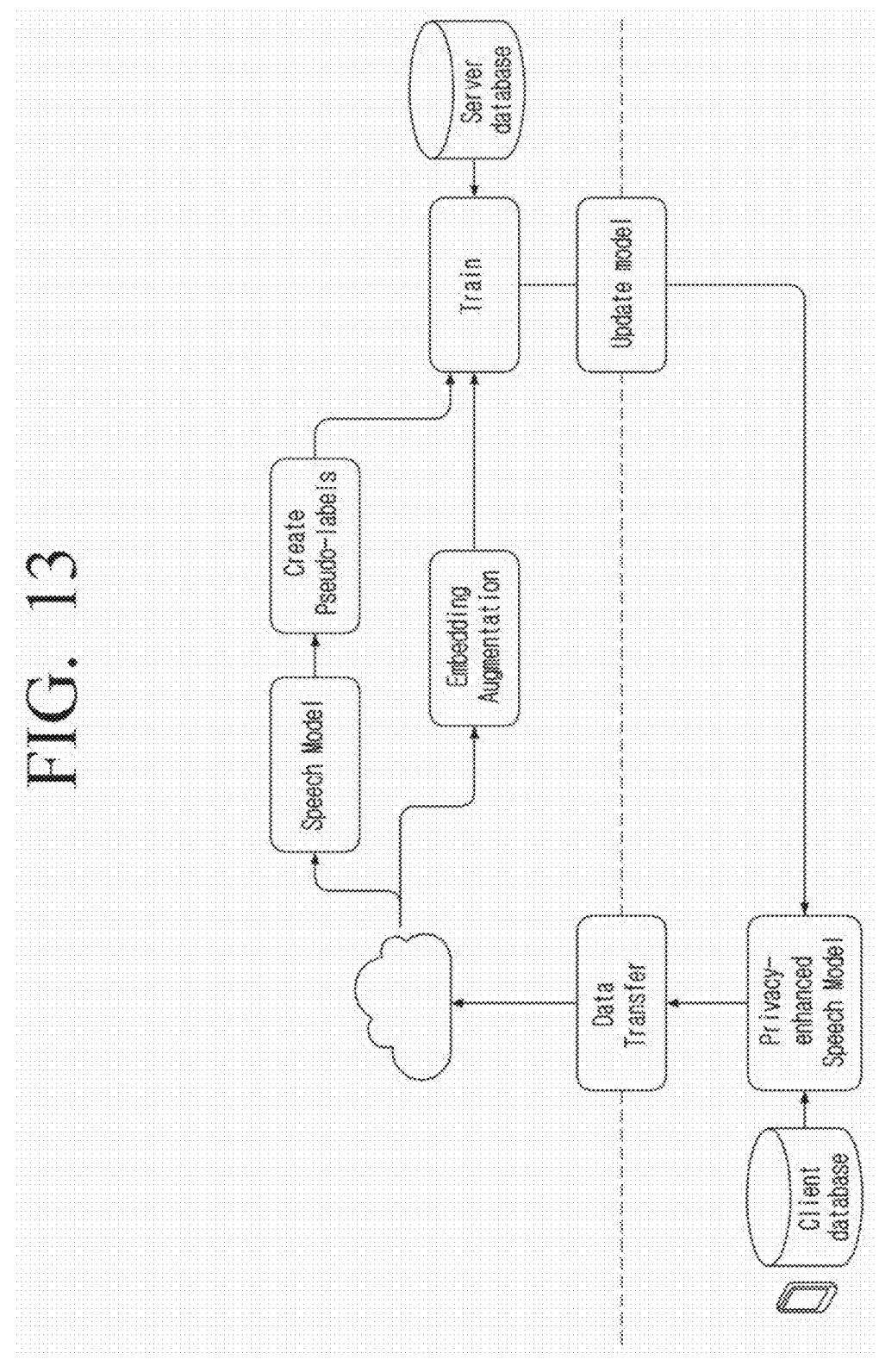
FIG. 13 is a schematic diagram showing how the client device is used to update the trained ML model.

FIG. 13 is a schematic diagram showing how the client device is used to update the trained ML model. To improve the trained ML model, the model may be periodically updated using data obtained from the client devices. To do so, each privacy-enhanced embedding vector received from a client device is decoded on the server to create pseudo-labels. The ML model is updated using the pseudo-labels and training data held by the server (e.g. public non-anonymised data), and using semi-supervised learning. For example, noise student training (NST) may be used, as described in D. S. Park et al., "Improved Noisy Student Training for Automatic Speech Recognition", Interspeech 2020. The updated model may be sent back to the client devices for use.

Figure 14:
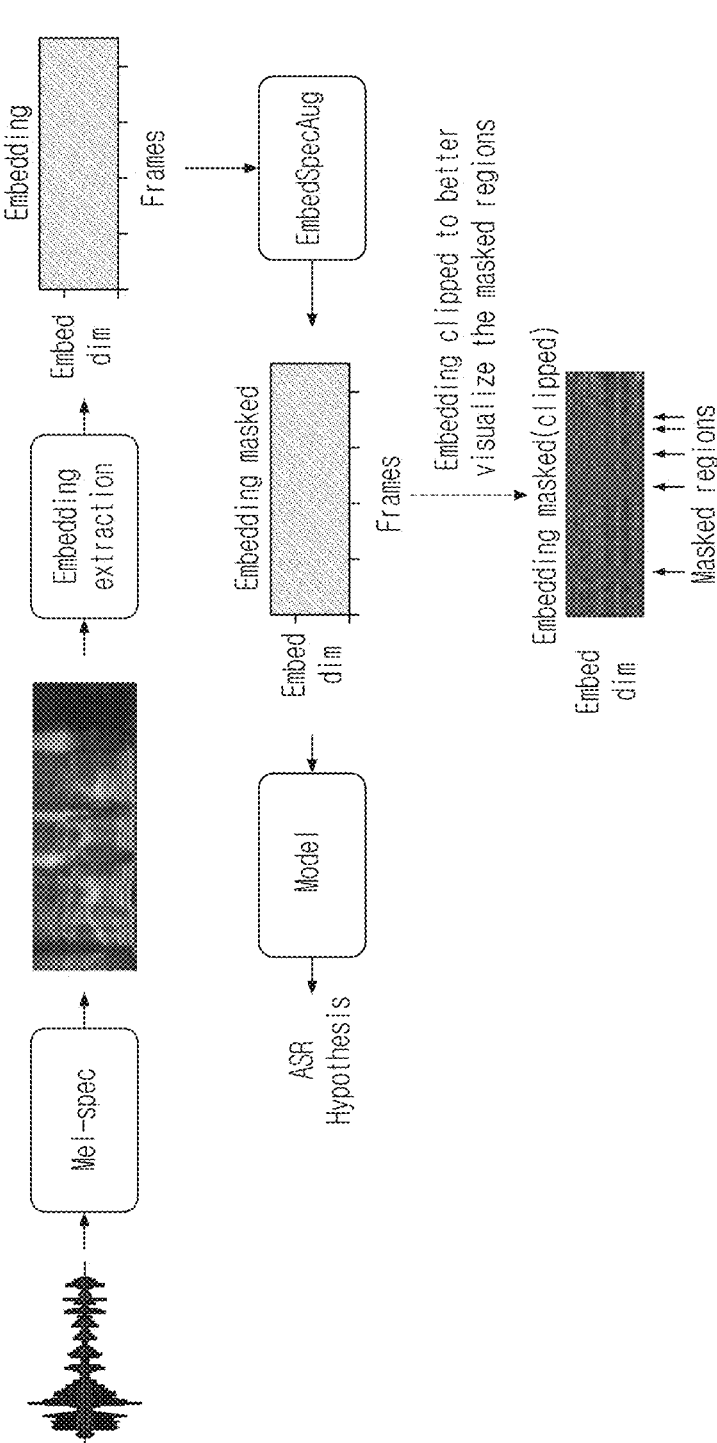
FIG. 14 is a schematic diagram showing how augmentation is used to anonymise speakers.

FIG. 14 is a schematic diagram showing how augmentation is used to anonymise speakers. As noted above, data augmentation may be used to further anonymise speakers. Data augmentation is commonly applied to the raw speech signal in existing ASR systems in order to improve performance. The present techniques use two techniques to perform augmentation in the embedding domain: EmbedAug and EmbedMixer.

The method may further comprise: augmenting, using the trained ML model, the generated at least one privacy-enhanced embedding vector, in embedding space to further anonymise the speaker. That is, after the at least one privacy-enhanced embedding vector has been generated, the method may augment the embedding vector to alter the embedding vector, which helps to anonymise the speaker even more. The augmentation may occur in embedding space, i.e. the space of the embedding vectors that represent the audio data items. In embedding spaces, embedding vectors which are similar are positioned closer to each other. In other words, the augmentation happens after the embedding vector has been generated, rather than on the original audio signal of the audio data item. This is in contrast to existing techniques, where data augmentation is commonly applied to the raw signal speech signal.

For example, augmenting the generated at least one privacy-enhanced embedding vector may comprise adding at least one of the following to the generated embedding vector: noise and reverberation. Noise may be added by adding a specific time domain noise signal to the generated embedding vector. For example, a noise value, vector or matrix representing the noise signal may be added to the generated embedding vector so that each value of the generated embedding vector is modified. Similarly, reverberation may be added by adding a specific reverberation impulse response to the generated embedding vector.

Additionally or alternatively, augmenting the generated at least one privacy-enhanced embedding vector may comprise altering spectral information and/or time information contained within the at least one privacy-enhanced embedding vector.

FIG. 14 shows the EmbedAug technique, which performs masking on the acoustic embedding generated before it is processed by the ML model to generate a privacy-enhanced embedding vector. That is, as shown in FIG. 14, the masking is performed after features have been extracted from the input audio data item and used to generate an embedding vector representing the extracted features, but before the embedding vector is processed by the ML model to remove information.

Figure 15:
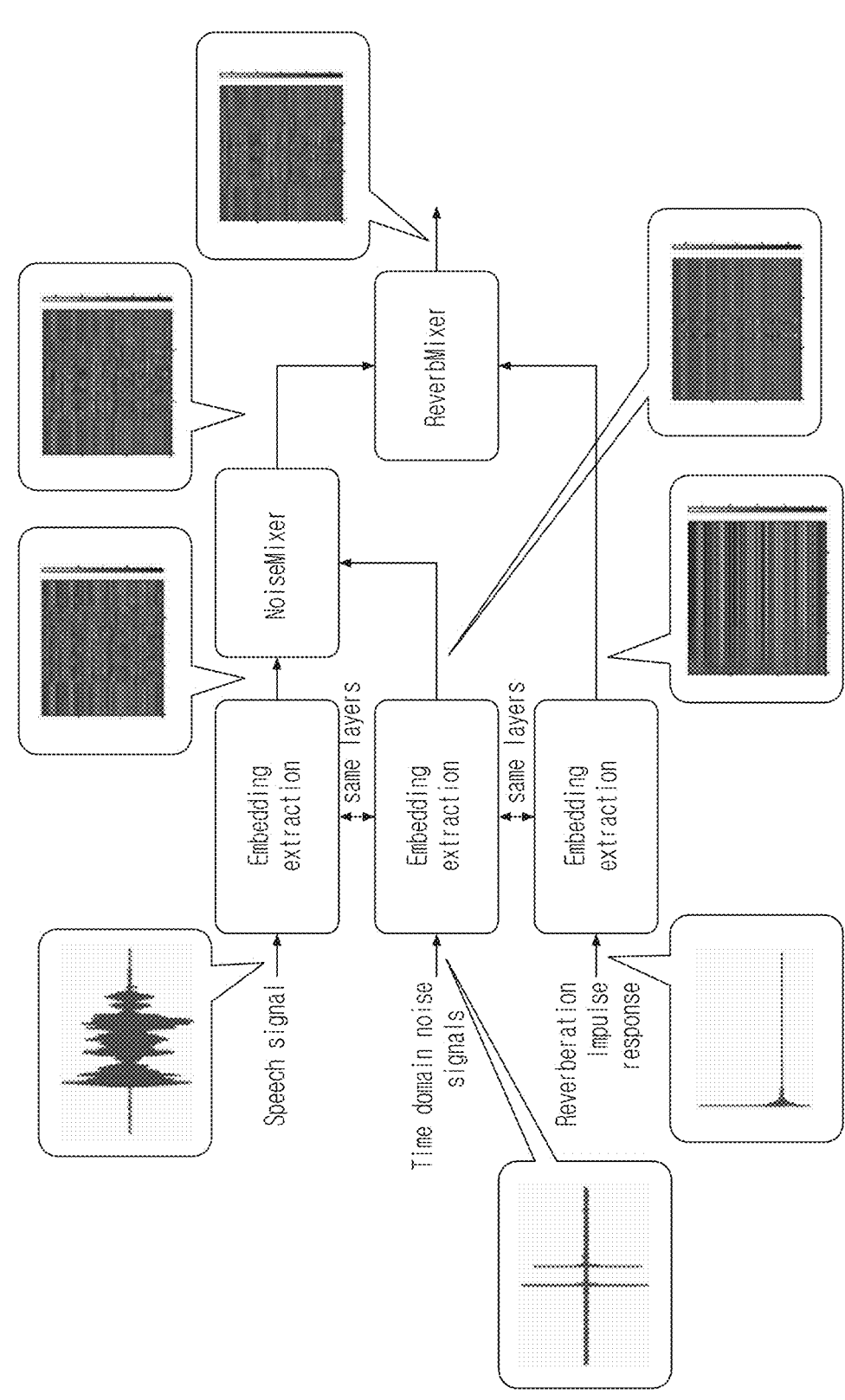
FIG. 15 is a schematic diagram showing further details on augmentation.

FIG. 15 is a schematic diagram showing further details on augmentation, and specifically the EmbedMixer technique, which adds noise and reverberation to the input audio data item and/or to the embedding vector representing extracted features. Again, the technique is applied before the ML model acts to remove information from the embedding vector.

Figure 16:
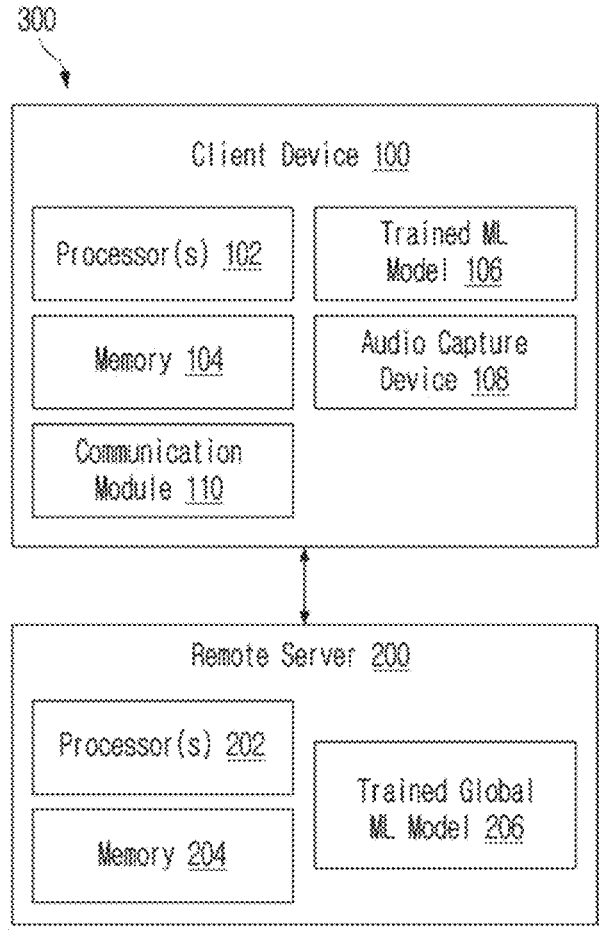
FIG. 16 is a block diagram of a system for training an ML model and using the trained ML model.

FIG. 16 is a block diagram of a system 300 for training an ML model and using the trained ML model. The system 300 for automatic speech recognition, ASR, comprises: a server 200 storing a global machine learning, ML, model 206 for ASR. The server may comprise at least one processor 202 coupled to memory 204.

During training, the at least one processor 202 coupled to memory 204, may be configured for: generating the global ML model 206 by injecting into a neural network having a plurality of layers and for performing ASR, at least one speaker anonymiser module between layers of the neural network; obtaining a first training dataset comprising a privacy-enhanced embedding vectors, each privacy-enhanced embedding vector representing an utterance spoken by a speaker of a plurality of speakers; obtaining a second training dataset comprising a plurality of audio data items, each audio data item containing an utterance spoken by a speaker of a plurality of speakers; training the global ML model by jointly: training the neural network, using the second training dataset, to extract acoustic features from the audio data items and generate embedding vectors representing the utterance within each audio data item; and training the at least one speaker anonymiser module to generate, using the generated embedding vectors and the first training dataset, privacy-enhanced embedding vectors which anonymise the speaker of each utterance.

The system 300 comprises a plurality of client devices 100. It will be understood that there may be any number of client devices 100 coupled to the server 200 (e.g. tens, hundreds, thousands or hundreds of thousands), but for the sake of simplicity a single client device 100 is shown here.

Each client device 100 comprises: a microphone or other audio capture device 108 arranged to capture an audio data item containing an utterance spoken by a speaker. The client device 100 comprises at least one processor 102 coupled to memory 104. The at least one processor 102 may comprise one or more of: a microprocessor, a microcontroller, and an integrated circuit. The memory 104 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The at least one processor 102 may be arranged for: generating, using a trained machine learning, ML, model 106 on the client device, at least one privacy-enhanced embedding vector for the audio data item, wherein the at least one privacy-enhanced embedding vector anonymises the speaker; transmitting the at least one privacy-enhanced embedding vector to the server 200 (via a communication module 110) for processing by the global ML model 206 on the server; receiving, from the server (via communication module 110), a processing result output by the global ML model for the at least one privacy-enhanced embedding vector that enables the client device to perform ASR.

Figure 17A:
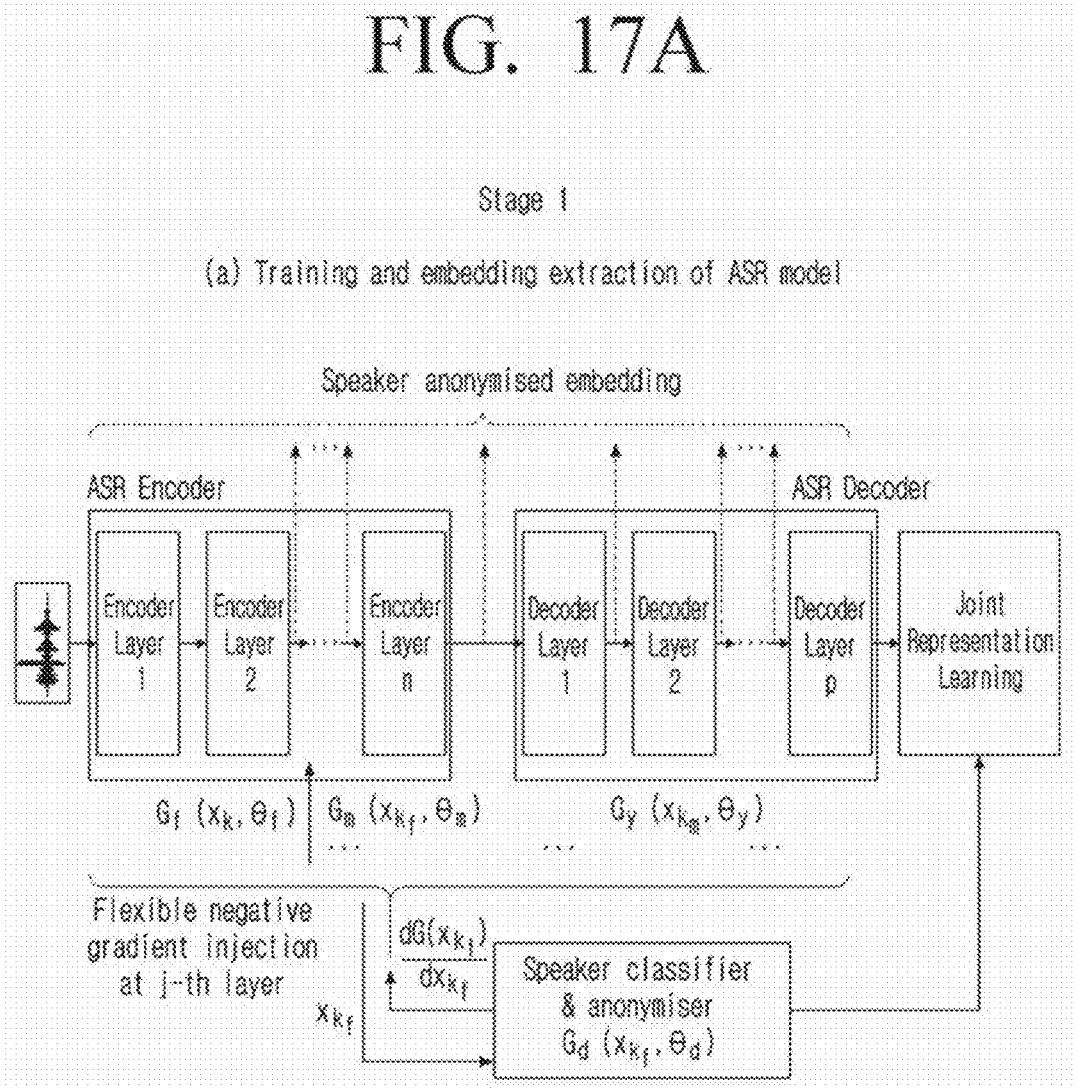
FIG. 17A is a schematic diagram of the present framework for training an ML model and evaluating the model.
Figure 17B:
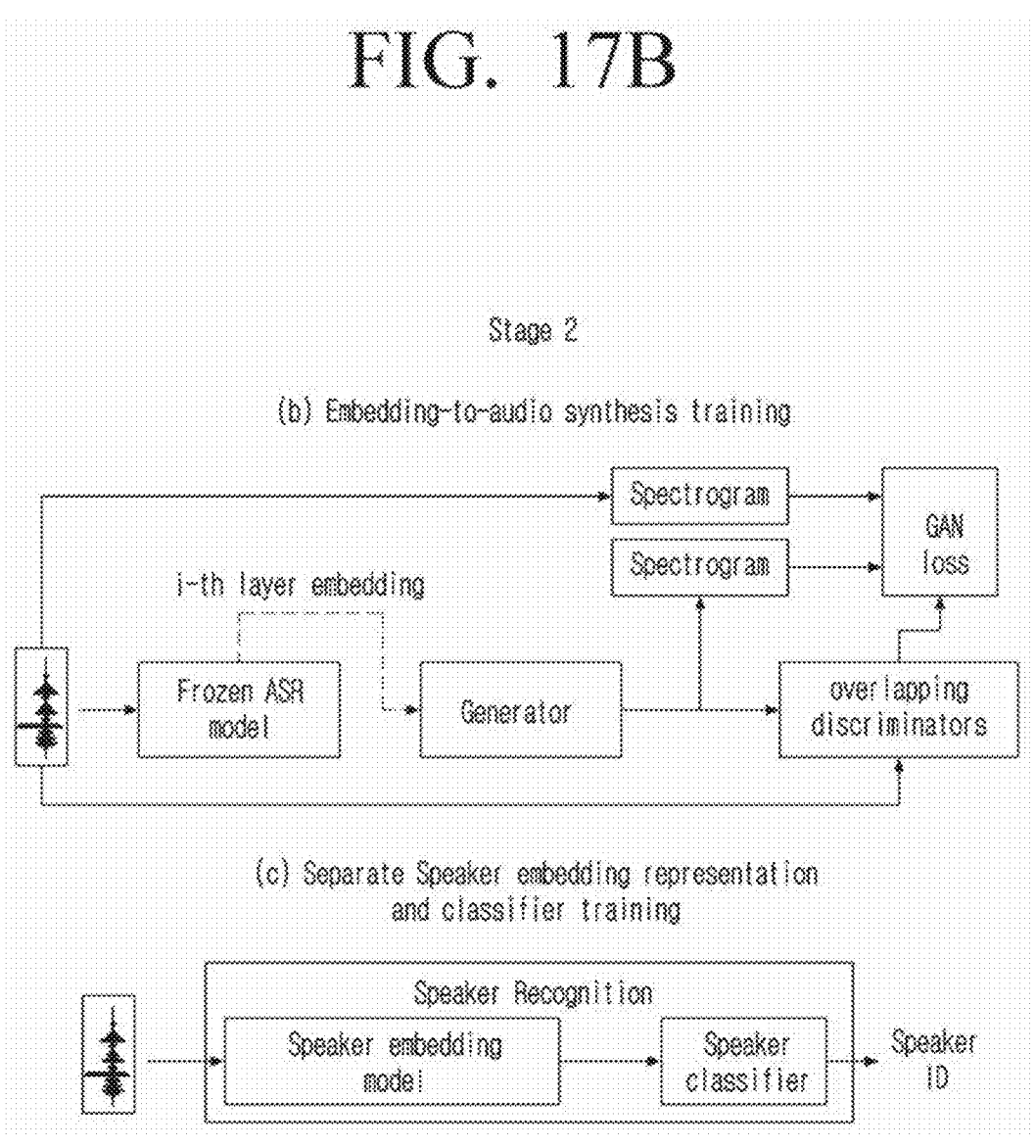
FIG. 17B is a schematic diagram of the present framework for training an ML model and evaluating the model.
Figure 17C:
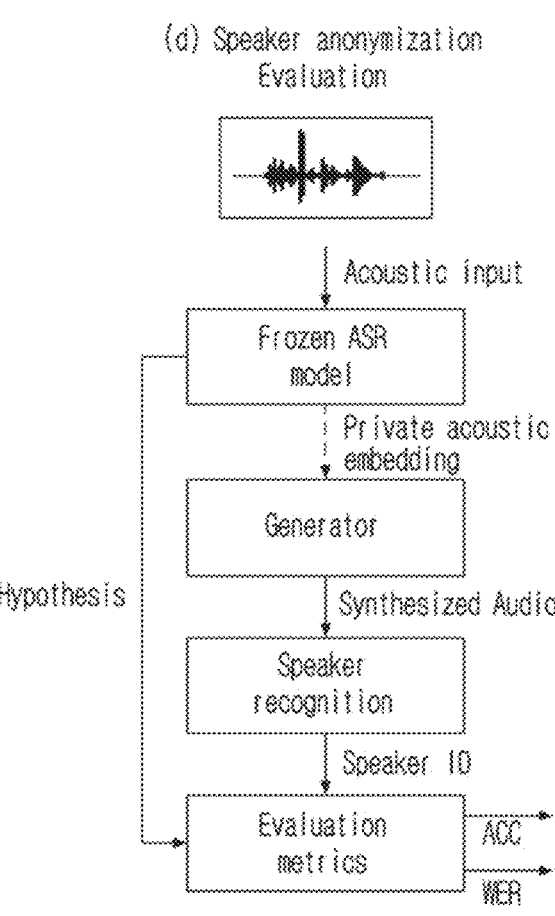
FIG. 17C is a schematic diagram of the present framework for training an ML model and evaluating the model.

FIG. 17 is a schematic diagram of the present framework for training an ML model and evaluating the model. As already discussed, the present techniques provide a flexible gradient reversal based speaker anonymization framework. The ML model learns speaker anonymous acoustic embeddings within an ASR model while preserving its accuracy/performance (as depicted in Stage 1 in FIG. 17A). The initial layers of ASR models learn generic acoustic and prosody features, and the last layers learn more task-dependant semantic and syntax level features. The research focuses on embeddings at the initial layers of ASR models. Furthermore, we introduce an acoustic embedding-to-waveform synthesis model to synthesise the corresponding audio waveform of the acoustic embedding for better understanding and interpretation (as shown in Stage 2 in FIG. 17B).

Some of the key contributions of the present techniques are as follows:

A method to use single gradient reversal at flexible layers of an ASR model to effectively mitigate speaker information from the representations generated by initial layers of the model without increasing its WER. In the analyses, it is observed that speaker identification accuracy was reduced by 22% at layer 3 (CE3), 7.3% at layer 5 (CE5), and 6% at layer 7 (CE7) compared to the original speech waveform (see FIG. 19). Performance of the models trained with these representations was improved by 8.6% WER on average. The proposed method does not require computationally expensive voice-conversion/speech-synthesis models for anonymization and operates on ASR embeddings.

The results show that while having improved ASR performance, the speaker adversarial training has anonymized acoustic embeddings with gradient scaling. A detailed analysis of the effects of gradient scaling, domain loss scaling and model layer hierarchies are presented with performance of models and their convergence properties. Furthermore, the mutual speaker information (depicted in Stage 3 in FIG. 17C) among the speaker embeddings are analysed and presented.

Contrary to the previous claims, it is shown that acoustic embeddings can be re-synthesised to intelligible audio recordings irrespective of certain types of convolution or feed-forward layers in network architectures of the models. Flexible Gradient Reversal Speaker Anonymization (FleGReSA)

Stage 1—Training Models and Extracting Embeddings

Training ASR Models: FIG. 17 shows the proposed framework with ASR model training in more detail. In this example, the baseline ASR model is a conformer model comprised of conformer blocks; as will be familiar to those in the art, a conformer block consists of layer normalisation, Feed-forward, Multi-Headed Self-Attention and Convolution modules. An x-vector (D. Snyder, D. Garcia-Romero, G. Sell, D. Povey, and S. Khudanpur, "X-vectors: Robust dnn embeddings for speaker recognition," in 2018 IEEE International Conference on Acoustics, Speech and Signal Processing (ICASSP), 2018, pp. 5329-5333.) speaker classification model is used with the ASR model for speaker anonymization through speaker adversarial training as described below.

Speaker Adversarial Training (SAT): The SAT aims to learn speaker invariant representations at different layers, and removes speaker specific information from acoustic embeddings. Here a gradient reversal layer may be added at different hierarchies of the ASR encoder with relevant gradient scaling, and the number of speaker invariant layers may be flexible. The gradient reversal is a 'pseudo function' $G(\cdot)$, which defines (a) forward and (b) backward pass with input $x_{k_f}$ by $$(a)\, G\left(x_{k_f}\right) = x_{k_f} \text{ and } (b)\, \frac{dG\left(x_{k_f}\right)}{dx_{k_f}} = -\alpha \cdot I \tag{1}$$

Here, $x_{k_f}$ is the output of the $i^{th}$ layer where the gradient reversal $G(\cdot)$ is applied, $\alpha$ is the gradient scaling factor, and I is the identity matrix. In the forward-pass (a), it follows the identity transformation, and in the backward-pass (b), it is multiplied by $-\alpha$. When gradient reversal is added at the i^th encoder block, the ASR model is split in: (1) feature extractor $x_{k_f} = G_f(x_f, \theta_f)$ which comprises the $1^{st}$ to the $i^{th}$ ASR encoder block; (2) speaker invariant encoder $x_{k_m} = G_m(x_{k_f}, \theta_m)$ defined by the remaining layers in the ASR encoder; and (3) ASR decoder $G_y(x_{k_m}, \theta_y)$. The $k^{th}$ input sample to the ASR model is $x_k$, and $\theta_f$, $\theta_m$ and $\theta_y$ denote the parameters in the feature extractor, speaker invariant encoder and decoder, respectively.

The discriminative speaker classifier $G_d(x_{k_f}, \theta_d)$, which is used to enforce invariant representations, takes input $G(x_{k_f})$ where $\theta_d$ denotes its parameters. The ASR model loss $L_y$ and the speaker classifier model loss $L_d$ are defined as $$L_y(\theta_f, \theta_m, \theta_y) = L_y(G_y(G_m(G_f(x_k, \theta_f), \theta_m), \theta_y), y_k) \qquad (2)$$

$$L_d(\theta_f, \theta_d) = L_d(G_d(G_f(x_k, \theta_f), \theta_d), s_k) \qquad (3)$$

where $y_k$ and $s_k$ are the transcription label and speaker label for the $k^{th}$ sample, respectively.

The final loss is given by $$L(\theta_f, \theta_m, \theta_y, \theta_d) = \frac{1}{K}\sum_{k=1}^{K} L_y^k(\theta_f, \theta_m, \theta_y) + \frac{1}{K}\sum_{(k=1)}^{K} \lambda \cdot L_d^k(\theta_f, \theta_d) \qquad (4)$$

where the total number of samples is K and $\lambda$ is speaker loss regularizer. The gradient of the loss with respect to the input can be written by (dropping arguments of the losses for clarity)

$$\frac{\partial L}{\partial x_k} = \frac{\partial x_{k_f}}{\partial x_k} \cdot \frac{\partial L}{\partial x_{k_f}} = \qquad (5)$$

$$\frac{\partial x_{k_f}}{\partial x_k} \cdot \left( \frac{\partial L_y}{\partial x_{k_f}} + \frac{dG(x_{k_f})}{dx_{k_f}} \cdot \frac{\partial L_d}{\partial G(x_{k_f})} \right) = \frac{\partial x_{k_f}}{\partial x_k} \cdot \left( \frac{\partial L_y}{\partial x_{k_f}} - \alpha \frac{\partial L_d}{\partial x_{k_f}} \right)$$

where $\alpha$ (the term in bold) is the gradient injected for speaker adversarial training. The speaker classifier used in the speaker adversarial training is based on x-vector model. Unlike the previous works, the speaker adversarial classifier is not a pre-trained model and it is trained jointly with the ASR model (Stage 1). After training, the speaker adversarial classifier is removed from the ASR model where the layers are trained to have speaker invariant acoustic representations, and only $\theta_f$, $\theta_m$, and $\theta_y$ are used for decoding.

Stage 2-Training Embedding-to-Audio Synthesis and Speaker Recognition Models

Neural Embedding to Speech Synthesis: Contrary to existing methods, where voice conversion approach is used to convert the audio to a different speaker's voice, the present techniques directly anonymize the acoustic embeddings from the ASR model. The speaker privacy in the anonymized acoustic embedding may be evaluated using speaker classifiers.

The discriminative speaker classifiers may be sensitive to small changes (e.g., perturbation difference) in embedding spaces among different ASR models. Moreover, the same utterances may have different embeddings obtained from different ASR models. Therefore, comparing embeddings provided by different ASR models to achieve speaker privacy is not very practical. As a result, an extra stage may be added to be able to listen to the audio synthesized from acoustic embeddings.

FIG. 17 shows an example method to employ acoustic embeddings for audio synthesis to evaluate the anonymization of the acoustic embeddings generated from the above techniques (Stage 2 in (b)). The embedding-audio synthesis model is based on HiFi GAN, and mixture of multi-period and multi-scale sub-discriminators.

During inference, the method takes embeddings from different layers and produces high resolution audio synthesis. If $x_{k_f}$ is the acoustic embedding obtained at the ith layer for waveform input $x_k$, then the synthesised output of the generator $\hat{x}_{k_i} = G_{syn}(x_{k_i})$ has the same dimension as $x_k$. Suitably, the training loss for the embedding-audio synthesis training is the summation of generator loss $L_{mel}$ and sub-discriminator loss $L_{FM}$ given by $$L_{mel} = \frac{1}{K}\sum_{k=1}^{K} \left\| \phi(x_k) - \phi(\hat{x}_{k_i}) \right\|_1, \qquad (6)$$

$$L_{FM}(D) = \frac{1}{K}\sum_{k=1}^{K} \sum_{i=1}^{T} \frac{1}{N_i} \left\| D^i(x_k) - D^i(\hat{x}_{k_i}) \right\|_1 \qquad (7)$$

Here $\phi$ is the function used for calculating spectrogram, T is the total number of layers in a discriminator and $N_i$ is the feature dimension of the ith layer output denoted by $D^i$. Mel-spectrogram loss ($L_{mel}$) and feature matching loss ($L_{FM}$) calculate $1_1$ distances between spectrograms and those between discriminator outputs during training. The discriminator in the synthesis module comprises Q sub-discriminators $$\{D_q\}_{q=1}^{Q}$$

which are used in the final losses:

$$L_{G_{syn}} = \sum_{q=1}^{Q} \qquad (8)$$

$$\left[ \frac{1}{K}\sum_{k=1}^{K} \left[ (D_q(x_k) - 1)^2 + (D_q(\hat{x}_{k_i}))^2 \right] + \lambda_{FM} L_{FM}(D_q) \right] + \lambda_{mel} L_{mel}$$

$$L_D = \sum_{q=1}^{Q} \frac{1}{K} \sum_{k=1}^{K} \left[ (D_q(\hat{x}_{k_i}) - 1)^2 \right] \qquad (9)$$

where $\lambda_{mel}$ and $\lambda_{FM}$ are loss scaling parameters.

Training Speaker Embedding and Identification Models: An x-vector model pre-trained on Voxceleb1 and Voxceleb2 is fine-tuned on LibriSpeech data for learning speaker representations. This model shown at (c) of the FIG. 17 is only used to evaluate the synthesized acoustic embeddings for speaker identification performance.

Stage 3—Speaker Anonymisation Evaluation

Speaker anonymization is evaluated on the waveforms synthesized from the acoustic embeddings using the generator described above as depicted in (d) of the FIG. 17. The acoustic embeddings are obtained from different layers of the ASR model and the waveforms are evaluated with the fine-tuned x-vector model.

Experimental Setup

Data: The publicly available LibriSpeech corpus was used for ASR model training (FIG. 17a), embedding extraction (FIG. 17a) and embedding-audio synthesis (FIG. 17b). The train-clean-100 (100 hours) split have been used for training. The dev-clean, test-clean, and test-other splits have been used for validation and testing. Additionally, train-clean-100 and train-clean-360 were combined into train-clean-460 (460 hours clean speech). This combined set was been used for the training of embedding-to-audio synthesis.

For the speaker adversarial ASR training, the labels for the ASR and speaker classifier models are desirable as the speaker classifier model utilises the same speakers for training and evaluation. Therefore, before the training, some utterances were randomly selected and separated from training data for each speaker to create (test-adv). The speaker classifier shown in (c) of the FIG. 17 is fine-tuned with dev-clean 70% of the speaker leaving 30% for evaluation (dev-clean-te).

Setup: Experiments were performed in three stages. In the first stage (FIG. 17a), the ASR model is trained with speaker adversarial loss as set out above. For testing, a conformer model with 12 encoder and 4 decoder blocks was used as the ASR baseline model. The model has 13.3M trainable parameters and it is decoded with a language model shallow fusion, beam size 1. The baseline model is used both for training the ASR model and extracting embeddings for audio synthesis. The baseline model embeddings are compared with the FleGReSA embeddings for evaluating their anonymity compared to the original audio samples, as per the second and third stages below.

In the second stage (FIG. 17b), acoustic embeddings are extracted from different layers, and then the embedding-audio GAN model is trained to reconstruct the original audio. The hyperparameters for the GAN training are similar to Kong, J. Kim, and J. Bae, "Hifi-gan: Generative adversarial networks for efficient and high fidelity speech synthesis," in Advances in Neural Information Processing Systems, H. Larochelle, M. Ranzato, R. Hadsell, M. Balcan, and H. Lin, Eds., vol. 33. Curran Associates, Inc., 2020, pp. 17 022-17 033. The synthesis models are trained with the clean 460 hours of LibriSpeech data.

In the third stage (FIG. 17c), the embedding-audio GAN generator is used to synthesize audio from acoustic embeddings to evaluate the speaker anonymity compared to the original audio utterances and baseline Evaluation: The ASR model is evaluated using Word Error Rate (WER), and speaker classifier is evaluated using the unweighted accuracy (WA) metric. ASR performance is evaluated with models where gradient reversal layers are applied at their different layers with different scaling $\alpha$ and $\lambda$ values. The goal is to analyse the impact of gradient reversal, and stabilise ASR training with scaling weights in different layers when gradient reversal is applied. The ASR decoding setup is same as the baseline. The speaker anonymization of the acoustic embeddings obtained from different layers of the ASR model is evaluated using the speaker identification accuracy based on x-vector as mentioned above.

FIG. 18 is a table of data from experiments to assess ASR performance of the present techniques. The ASR performance of the speaker adversarial ASR is shown in FIG. 18 where: 'CE' denotes conformer encoder; 'CD' denotes conformer decoder; the number following 'CE' or 'CD' is the embedding layer number; $\alpha$ and $\lambda$ are scaling factors used in Eq. (4) and (1).

As discussed above, the present techniques introduce a flexible speaker adversarial at various hierarchies of the encoder/decoder model and found, advantageously, ASR performance improvements. The test-adv WER shows the ASR performance on utterances which have common speakers with the train data but not common utterances. The other test sets are standard dev-clean, test-clean and test-other. The overall results given in Table 1 show that the ASR performance obtained from speaker adversarial training improves across the test scenarios compared to the baseline (first row). That is, it is observed that adding gradient reverse layers in the lower layers does not decrease the ASR performance. The weight of the gradient reversal layer is crucial in the initial convergence and overall performance of the ASR model according to FIG. 18. The results show that that high values for $\alpha$ and $\lambda$ prevent the ASR model from converging. Furthermore, the weight of the gradient reversal layer a is also dependent on the layer of the ASR model where the gradient reversal layer is injected, as the linguistic and speaker information are highly entangled at the initial layers of the encoder of the ASR model. The $\alpha$ and $\lambda$ weights are desirably smaller to make the ASR model stable as lower negative speaker gradients distort the sequential linguistic entanglement in the acoustic embeddings, and it loses the linguistic boundary information. As a result, the ASR model mostly predicts blanks and misaligned word sequences.

Next, how the layers can become speaker invariant after the intersection of gradient reversal layers is analysed. FIG. 19 is a table of data from experiments to assess speaker accuracy. In FIG. 19, the higher the speaker accuracy the less anonymous the speaker representations are.

The results show that with the adversarial training, the ASR model embeddings are more speaker redundant. For example, the adv_CE3D model shows that when the gradient reversal is injected at layer 3 of the encoder (CE3), and the embedding is extracted from layer 5 of the encoder (CE5), the acoustic embeddings are more anonymous compared to when the acoustic embeddings extracted from layer 3. This suggests that it is difficult to control the trade-off between embedding speaker quality and downstream task performance by flexible adversarial training. Thereby, the present techniques achieve speaker anonymity in acoustic embeddings without expensive efforts like on-device voice morphing or conversion. Next, comparing the audio waveform reconstructed using the baseline model to the original audio waveform, it is observed that plenty of speaker information remains in the acoustic embeddings at the convolution and fully-connected layers obtained from the baseline.

The speaker anonymization of the embeddings is further assessed computing the mutual information (MI) of random variables of the embeddings. For this purpose, we compute the MI using embeddings $$\hat{x}_{k_i}^b$$

obtained at the $i^{th}$ layer of the baseline model and the embeddings $$\hat{x}_{k_i}^a$$

obtained at the $i^{th}$ layer of the anonymized model. The MI is computed between the original waveform $x_k$ and the synthesized audio $$\hat{x}_{k_i}$$

using $$I(x_k, \hat{x}_{k_i}) = \sum_{x_k, \hat{x}_{k_i}} p(x_k, \hat{x}_{k_i}) \log \frac{p(x_k, \hat{x}_{k_i})}{p(x_k)p(\hat{x}_{k_i})} \tag{10}$$

Figure 20A:
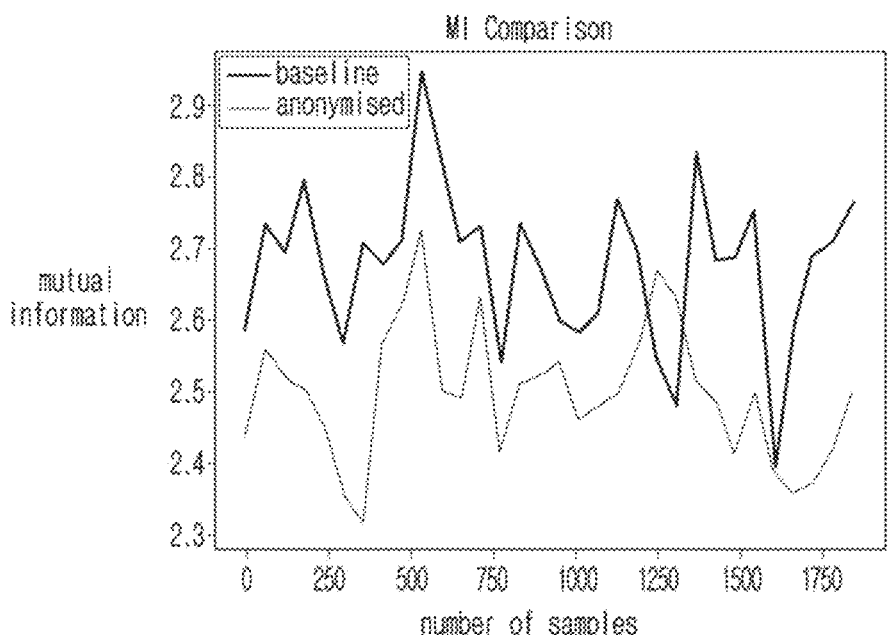
FIGS. 20A and 20B are graphs showing results from experiments to test the ML model of the present techniques.
Figure 20B:
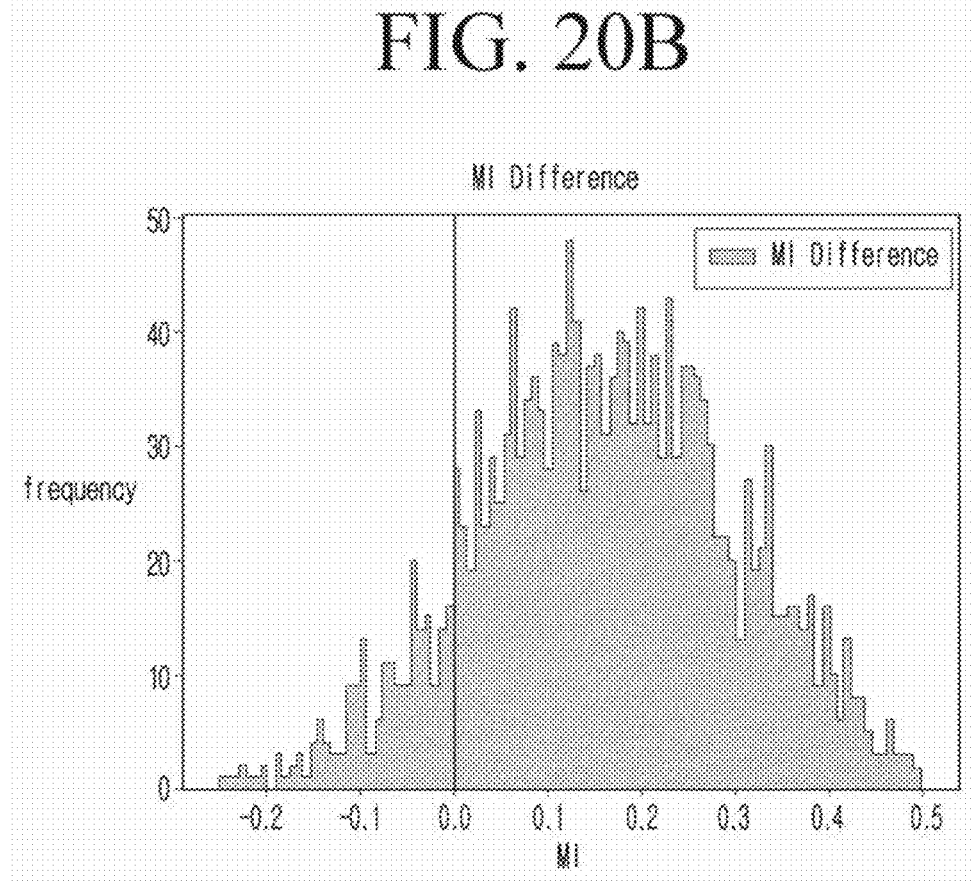

The frequency of the MI difference $$I(x_k, \hat{x}_{k_i}^b) - I(x_k, \hat{x}_{k_i}^a)$$

is plotted as a histogram to analyze the information loss among samples in FIGS. 20A and 20B.

In FIG. 20A, the blue (generally higher) line denotes the speaker MIs computed with $$I\left(x_k, \hat{x}_k^b\right)$$

for dev-clean where $$\hat{x}_{k_i}^b$$

is generated with the baseline synthesised model (i.e. Baseline in FIG. 19). The orange (generally lower) line in FIG. 20A denotes the speaker MIs calculated as $$I\left(x_k, \hat{x}_{k_i}^a\right)$$

where $$\hat{x}_{k_i}^a$$

is generated with the anonymized model (i.e. adv_CE3D_v1 in FIG. 19). The difference between these two curves is displayed in FIG. 20B as a histogram. These results show evidence of the speaker information reduction using the anonymized model where a substantial proportion of the utterances is reduced after speaker anonymization. These results corroborate the findings observed in FIG. 19.

In summary, the above discussion has demonstrated an adaptive gradient reversal speaker anonymization (AGReSA) and evaluation framework. One of the main benefits is that the anonymization is part of the ASR model. Once the ASR model is trained with the domain adversarial speaker classifier, the latter is discarded and only the ASR model is employed to provide the anonymous acoustic embeddings. It is shown that the training is flexible depending upon the acoustic embedding extraction layer and desired downstream task. The results show that the ASR model is stable and performs better with the adversarial training while providing significant speaker anonymization on the acoustic embeddings. Experiments on the LibriSpeech indicate a reduction in speaker recognition accuracy by 84.7% while decreasing the relative WER of the ASR model by 14%. Furthermore, there is presented an embedding to audio waveform high-quality synthesis model not only comparing speaker information but subjectively listening to the layer-wise embeddings.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

What is claimed is:

1. A computer-implemented method, performed by a client device that is resource-constrained, for automatic speech recognition, ASR, the method comprising:

obtaining an audio data item containing an utterance spoken by a speaker;

generating, using a trained machine learning, ML, model on the client device, at least one privacy-enhanced embedding vector for the audio data item, wherein the at least one privacy-enhanced embedding vector anonymises the speaker, wherein the ML model on the client device is trained to recognize audio information from the audio data item that identifies the speaker and remove the audio information;

transmitting the at least one privacy-enhanced embedding vector to a server for processing by a global machine learning, ML, model on the server, wherein the global ML model on the server has higher accuracy and is larger than the ML model on the client device;

receiving, from the server, a processing result output by the global ML model for the at least one privacy-enhanced embedding vector that enables the client device to perform the ASR; and performing, by the client device, the ASR based on the processing result received from the server.

2. The method as claimed in claim 1 wherein generating the at least one privacy-enhanced embedding vector comprises:

removing, using the trained ML model, the audio information from the audio data item that identifies the speaker, so that the generated at least one privacy-enhanced embedding vector anonymises the speaker.

3. The method as claimed in claim 1 wherein generating at least one privacy-enhanced embedding vector comprises:

removing, using the trained ML model, background noise from the audio data item so that the generated at least one privacy-enhanced embedding vector only represents the utterance spoken by the speaker.

4. The method as claimed in claim 1 further comprising:

augmenting, using the trained ML model, the generated at least one privacy-enhanced embedding vector, in embedding space to further anonymise the speaker.

5. The method as claimed in claim 4 wherein augmenting the generated at least one privacy-enhanced embedding vector comprises adding at least one of noise and reverberation to the generated at least one privacy-enhanced embedding vector.

6. The method as claimed in claim 4 wherein augmenting the generated at least one privacy-enhanced embedding vector comprises altering spectral information and/or time information contained within the at least one privacy-enhanced embedding vector.

7. The method as claimed in claim 1 wherein generating at least one privacy-enhanced embedding vector comprises:

inputting the audio data item into the trained ML model on the client device, wherein the trained ML model comprises a neural network;

extracting, using the neural network, at least one embedding vector representing acoustic features of the audio data item; and generating, using the neural network, the at least one privacy-enhanced embedding vector from the extracted at least one embedding vector.

8. An electronic client device that is resource-constrained, for automatic speech recognition, ASR, the electronic client device comprising:

a microphone arranged to capture an audio data item containing an utterance spoken by a speaker; and

27 at least one processor coupled to memory, arranged for:
generating, using a trained machine learning, ML, model
on the client device, at least one privacy-enhanced
embedding vector for the audio data item, wherein the
at least one privacy-enhanced embedding vector anonymises the speaker, wherein the ML model on the
client device is trained to recognize audio information
from the audio data item that identifies the speaker and
remove the audio information;
transmitting the at least one privacy-enhanced embedding
vector to a server for processing by a global machine
learning, ML, model on the server, wherein the global
ML model on the server has higher accuracy and is
larger than the ML model on the client device;
receiving, from the server, a processing result output by
the global ML model for the at least one privacy-
enhanced embedding vector that enables the client
device to perform the ASR; and
performing, by the client device, the ASR based on the
processing result received from the server.
9. A computer-implemented method, performed by a
server, for training a global ML model for automatic speech
recognition, ASR, the method comprising:
generating the global ML model by injecting, into a neural
network which has a plurality of layers and which is for
performing the ASR, at least one speaker anonymiser
module between layers of the neural network;
obtaining a first training dataset comprising a plurality of
privacy-enhanced embedding vectors, each privacy-
enhanced embedding vector representing an utterance
spoken by a speaker of a first plurality of speakers;
obtaining a second training dataset comprising a plurality
of audio data items, each audio data item containing an
utterance spoken by a speaker of a second plurality of
speakers;
training the global ML model by jointly:
training the neural network, using the second training
dataset, to extract acoustic features from the plurality of
audio data items and generate, using the extracted
acoustic features, embedding vectors representing the
utterance within each audio data item; and
training the at least one speaker anonymiser module to
generate, using the generated embedding vectors and the first training dataset, privacy-enhanced embedding
vectors which anonymise the speaker of each utterance.
10. The method as claimed in claim 9 wherein training the
at least one speaker anonymiser module to generate privacy-
enhanced embedding vectors comprises:
training the at least one speaker anonymiser module to
remove speaker-identifying audio information from the
generated embedding vectors.
11. The method as claimed in claim 10 wherein training
the at least one speaker anonymiser module comprises
training the at least one speaker anonymiser module to
identify and remove any one or more of the following from
the generated embedding vectors: prosody, pitch, speaking
style, speed, and volume.
12. The method as claimed in claim 9 wherein training the
at least one speaker anonymiser module to generate at least
one privacy-enhanced embedding vector comprises:
training the at least one speaker anonymiser module to
remove background noise from the audio data item so
that the generated at least one privacy-enhanced
embedding vector only represents the utterance spoken
by the speaker.
13. The method as claimed in claim 9 wherein training the
at least one speaker anonymiser module further comprises:
training the at least one speaker anonymiser module to
augment the generated at least one privacy-enhanced
embedding vector, in embedding space to further ano-
nymise the speaker.
14. The method as claimed in claim 9 wherein the neural
network comprises an encoder and a decoder, each having a
plurality of layers, and wherein the injecting the at least one
speaker anonymiser module comprises injecting the at least
one speaker anonymiser module between layers of the
encoder.
15. The method as claimed in claim 9 further comprising:
generating a local ML model suitable for use by a
plurality of client devices by:
creating a copy of the global ML model after the training
has been performed; and
removing the at least one speaker anonymiser module
from the copy of the global ML model.

* * * * *